US011315777B2

(12) United States Patent
Gorbunov et al.

(10) Patent No.: US 11,315,777 B2
(45) Date of Patent: Apr. 26, 2022

(54) METHOD AND APPARATUS FOR CONCENTRATING IONISED MOLECULES

(71) Applicant: ANCON TECHNOLOGIES LIMITED, Kent (GB)

(72) Inventors: Boris Zachar Gorbunov, Kent (GB); Michael Douglas Burton, Kent (GB); David Benjamin Müller, Kent (GB)

(73) Assignee: ANCON TECHNOLOGIES LIMITED, Kent (GB)

( * ) Notice: Subject to any disclaimer, the term of this patent is extended or adjusted under 35 U.S.C. 154(b) by 0 days.

(21) Appl. No.: 16/715,056

(22) Filed: Dec. 16, 2019

(65) Prior Publication Data

US 2021/0183633 A1   Jun. 17, 2021

(51) Int. Cl.
*H01J 49/06* (2006.01)
*G01N 27/622* (2021.01)
*H01J 49/00* (2006.01)

(52) U.S. Cl.
CPC ......... *H01J 49/062* (2013.01); *G01N 27/622* (2013.01); *H01J 49/0031* (2013.01)

(58) Field of Classification Search
CPC ......... G01N 27/622; G01N 2001/2223; G01N 2015/0046; G01N 27/624; G01N 15/0255; G01N 15/0266; G01N 15/0656; G01N 15/10; G01N 15/1404; G01N 15/1459; G01N 1/2202; G01N 1/2208; G01N 1/2247; G01N 1/40; G01N 2001/4038; G01N 2015/0038; G01N 2015/0288; G01N 2015/1087; G01N 2015/149; B03C 3/06; B03C 3/49; B03C 3/02; B03C 3/025; B03C 3/36; B03C 3/41; B03C 3/68; H01J 49/061; H01J 2237/053; H01J 2237/334; H01J 37/3244; H01J 37/32834; H01J 37/32853; H01J 37/32871; H01J 37/32981
USPC ....... 250/281, 282, 290, 292; 356/72; 96/18, 96/54
See application file for complete search history.

(56) References Cited

U.S. PATENT DOCUMENTS

| | | | |
|---|---|---|---|
| 5,162,652 A | 11/1992 | Cohen et al. | |
| 5,854,431 A | 12/1998 | Linker et al. | |
| 6,783,680 B2 | 8/2004 | Malik | |
| 2005/0105079 A1* | 5/2005 | Pletcher | G01N 15/1404 356/72 |
| 2011/0277632 A1* | 11/2011 | Pant | B03C 3/68 95/57 |
| 2013/0068942 A1 | 3/2013 | Verenchikov | |
| 2016/0370320 A1* | 12/2016 | Gorbunov | G01N 15/0266 |
| 2017/0153172 A1* | 6/2017 | Ikeda | H01J 37/3244 |
| 2018/0128716 A1* | 5/2018 | Seki | G01N 1/40 |
| 2018/0266990 A1* | 9/2018 | Gorbunov | G01N 27/624 |

FOREIGN PATENT DOCUMENTS

| | | |
|---|---|---|
| CA | 2672249 A1 | 6/2008 |
| JP | 2015114230 A | 6/2015 |

OTHER PUBLICATIONS

Entech Instruments, "7200CTS Cryogen-Free Preconcentrator," 2019 Brochure, Simi Valley, CA, pp. 1-8.

* cited by examiner

*Primary Examiner* — David A Vanore
(74) *Attorney, Agent, or Firm* — Heslin Rothenberg Farley & Mesiti P.C.

(57) ABSTRACT

The invention provides a method and apparatus subjecting an analyte in an ion concentrating chamber to an electric and velocity field to concentrate analyte ions into a smaller space.

7 Claims, 15 Drawing Sheets

METHOD AND APPARATUS FOR CONCENTRATING IONISED MOLECULES

This invention relates to a method and apparatus for concentrating analyte molecules of interest in a sample gas by ionising the analyte molecules and then concentrating the analyte ions of interest before directing them to an instrument for analysis. More specifically, the invention provide a method and apparatus for increasing the concentration of ionised molecules in a sample to improve sensitivity of analysis and to lower the low detection limit of various ion measuring instruments. The invention is particularly applicable to the detection of very low concentrations of analytes such as those encountered in the detection of explosives in airports.

BACKGROUND OF THE INVENTION

Volatile Organic Compounds (VOC) in the ambient air are the result of emissions from many industrial or natural sources. Some VOCs are harmful to human health (e.g. polyaromatic hydrocarbons, benzene, 1,3-butadiene) and others are involved in atmospheric chemistry such as ozone precursors. The levels of some of such VOCs are very low, e.g. at the low part-per-billion (ppb) or even at part-per-trillion (ppt). In order to quantify VOCs present in ambient air at such low trace levels, it is necessary first to increase the concentration of VOCs (for example using pre-concentrators) to a level at which they can be detected and analysed.

A major application where more sensitive methods are needed to detect trace amounts of airborne compounds is airport security. Most explosive compounds are semi-Volatile Organic Compounds (SVOC) and, for airport security applications, typically need to be detected in the air at levels in concentrations of less than one part-per-trillion (ppt).

Pre-concentrators can be used to increase concentrations ("preconcentrate") of VOCs in a sample before analysis and such pre-concentrators can enable the Limit of Detection (LOD) to be reduced to few ppt. Such pre-concentrator devices are often stand-alone units that are connect to a gas chromatograph (GC) or other detecting device.

The use of gas chromatography (GC) or gas chromatography-mass spectrometry (GC-MS) for the analysis of VOCs is well-established. For GC-MS, the LOD can decreased by pre-concentration of the analytes, commonly by means of adsorbents or cryogenic trapping, see for example https://www.entechinst.com/cryogenic-ion-concentration-theory/.

A number of patents have been granted for vapour pre-concentration devices. For example, U.S. Pat. No. 6,783,680 discloses "Sample preconcentration tubes with sol-gel surface coatings and/or sol-gel monolithic beds". The method of pre-concentrating trace analytes disclosed in U.S. Pat. No. 6,783,680 involves extracting polar and non-polar analytes through a sol-gel coating. The sol-gel coating is either disposed on the inner surface of a capillary tube or disposed within the tube as a monolithic bed. The amount of sample collected in a pre-concentrator is influenced by the pre-concentration time. When a sufficient amount of sample is accumulated, the deposited sample is heated and evaporated quickly. The increase in concentration is equal to the ratio of the ion-concentration time to the evaporation time.

U.S. Pat. No. 5,854,431 discloses a particle pre-concentrator for pre-concentrating particles and vapours. The pre-concentrator apparatus of U.S. Pat. No. 5,854,431 is said to permit detection of highly diluted amounts of samples in a main sample gas flow, such as a stream of ambient air. A main sample gas flow having airborne particles entrained therein is passed through a pervious screen and the particles accumulate upon the screen, and this the screen acts as a sort of selective particle filter.

Gas chromatographs with pre-concentrators have been widely used for laboratory analysis of complex gas mixtures but, in many applications, a fast response is required which cannot readily be provided by GC. For example, the use of GC in airport security and contraband detection is limited by inability of GC-MS to meet the requirement for high speed throughput. Ion Mobility Spectrometry (IMS) with a sub-second detection time is therefore mainly used for security applications.

U.S. Pat. No. 5,162,652 discloses the rapid detection of contraband and toxic materials by trace vapour detection using IMS. Thus, molecules of interest, typically toxic or contraband, located within sealed luggage are detected by subjecting the sealed luggage to a process whereby a portion of the enclosed atmosphere within the luggage is extracted and combined with the surrounding atmosphere in a closed chamber. The extracted, combined sample is passed to a collector, typically a molecule adsorber, which concentrates the chosen molecules by collection on a collecting surface. After the end of a collection period, the adsorbed molecules are released from the surface and passed to an identifier, such as an IMS. By use of appropriate collection and valving elements, analysis can be accomplished.

CA2672249 discloses an IMS detector apparatus and pre-concentrator whereby the IMS detector has a pin-hole or capillary inlet having a coating of a material, such as polydimethylsiloxane, onto which an analyte substance of interest can be adsorbed. The analyte is adsorbed onto the material until a heater is energised to heat the material and release the adsorbed analyte substance for detection.

The pre-concentrators described above suffer from the disadvantage that they involve the use of substrates that need to be exposed to low concentration sample flows for some time in order to accumulate sufficiently large amounts of sample to enable testing to be carried out. For security applications fast detection is important, and therefore the pre-concentration time should be limited to no more than 1 second. The need for speed reduces the pre-concentration efficiency. In addition, in a complex sample, adsorbed molecules may undergo chemical transformations during the accumulation time. These factors make pre-concentration devices inefficient and hence unsuitable for security and border control applications.

In mass spectrometry, ion and electron trap devices can be used to improve sensitivity and/or resolution. For example, US20130068942 discloses an electrostatic trap mass spectrometer that may comprise at least two parallel sets of electrodes separated by a field-free space, wherein the parallel electrode sets extend along a curved Z-direction locally orthogonal to said X-Y plane such that each of the electrode sets define a volume with a two-dimensional electrostatic field in an X-Y plane and define either planar or toroidal field regions. Means are provided for adjusting the toroidal field regions to provide both (i) stable trapping of ions passing between the fields within the X-Y plane and (ii) isochronous repetitive ion oscillations within the X-Y plane such that the stable ion motion does not require any orbital or side motion. In addition, an "ion bounding means" in the curved Z-direction is configured to compensate time-of-flight distortions at Z-edges of the trap. However, a problem with ion trap technologies is that they require a vacuum, and this make them unsuitable for use in the atmospheric pressure ion mobility spectrometers widely used in the security field.

Thus, existing pre-concentrating devices suffer from a number of problems that limit their suitability for many security and police applications. As discussed above, such problems include the prolonged periods needed for pre-concentrators to accumulate sufficient quantities of analyte to enable detection and quantification to take place, and the inability of some devices such as ion trap devices to operate at atmospheric pressure. Therefore, there is a need for a method and apparatus for increasing concentrations of molecules of interest in sample gases such as air without the need for prolonged periods for sample accumulation and without the need for complex vacuum systems.

The Invention

This invention provides a method and an apparatus for concentrating molecules of interest before they are introduced into an ion-detecting and/or counting device. According to the method of the invention, analyte molecules of interest in a sample gas (e.g. air) flow are first ionised and then introduced into an ion-concentrating chamber where the ions are subjected to a combination of a non-linear electric field and an air velocity field that concentrate ions into a smaller volume. The chamber is configured so that the smaller volume of gas (e.g. air) in which the ions are concentrated can be drawn off through one outlet whereas air which contains non-ionised molecules can be drawn off through another outlet. The combined flow rates of air through the ion-collecting outlet and the neutral molecule collecting outlet must be equal to the flow rate into the chamber and it follows therefore that ionised molecules will leave the apparatus and can enter a detection device with a smaller flow rate then the flowrate at the inlet of the apparatus. This increases the concentration of analytes in the sample. In addition, the invention enables the removal of airborne aerosol particles and neutral analyte molecules from the sample flow of ionised analyte molecules thereby considerably reducing their concentrations in the ion-detecting device. This increases the performance of the ion-detecting device.

In certain circumstances, analytes of interest may already be in ionised form when they enter the apparatus. For example, there are applications where it may be desired to detect and/or identify trace quantities of ions in the air or other gases, specific examples of such applications being in atmospheric research or for quantification of extremely low levels of ionising radiation in nuclear physics or geophysics. In such circumstances, the means for creating ions from molecules may not be required and can either be disabled or switched off or, where the apparatus is only intended for use in such circumstances, can be omitted altogether.

In this application, the concentrating of molecules of interest in ionised form before they are introduced into an ion-detecting and/or counting device does not require an additional pre-concentrating time in contrast to prior art devices. The method of the invention is a real-time method in that it avoids the need for prolonged periods of sample accumulation inherent in many known methods of ion pre-concentration. To emphasize the difference, the apparatus of the invention may be referred to as a real-time molecule concentrator, real-time molecule-concentrating apparatus, molecule concentrator, molecule-concentrating device or apparatus or similar term. Unless the context suggests to the contrary, these terms are intended to be synonymous. The ion-concentrating chamber used in the apparatus and method of the invention to concentrate the ionised molecules of interest may be referred to for convenience as the ion concentration chamber The real-time molecule-concentrating method of the invention can beneficially be used in many different methods of identification and quantification of number concentrations of trace compounds in air and other gases, at atmospheric as well as at lower and higher pressures.

Accordingly, in one aspect, the invention provides a method for increasing the number concentration of molecules of an analyte of interest in real time from a sample gas flow containing the analyte and other molecules; the method comprising:

(a) when the analyte molecules of interest in the sample gas flow are non-ionised or are not ionised to a desired extent, exposing the sample gas flow to an ionising entity to bring about formation of ions of the analyte and then passing the sample gas flow through an ion-concentrating chamber; or (b) when the analyte molecules of interest in the sample gas flow are already ionised, passing the sample gas flow through an ion-concentrating chamber without first exposing the sample gas flow to an ionising entity;

whereby, in the ion-concentrating chamber, analyte ions and other molecules are subjected to an electric field and a velocity field such that analyte ions are concentrated by the combined effects of the electric field and velocity field into a smaller space; wherein the ion-concentrating chamber has at least one ion-collecting outlet through which gas containing analyte ions from the said smaller space can leave the chamber for onward movement to an ion-identifying and/or quantifying and/or selecting device, and at least one neutral molecule-collecting outlet through which gas containing neutral molecules can leave the chamber.

In another aspect, the invention provides a method for increasing number concentration of molecules including analytes in real time from a gaseous mixture of molecules, which method comprises:

(a) providing an ion-concentrating chamber having an inlet with a defined inlet cross section, and two outlets, and optionally ionisation means (e.g. an ionising device or entity) positioned at the inlet to the chamber for creating ions from the molecules;

(b) directing a flow of air (or other gas) containing an ion sample through the chamber inlet at a defined flow rate into the ion-concentrating chamber via the chamber inlet and dividing the flow of air (or other gas) into two parts: a first part containing neutral molecules being directed to a first outlet by the velocity field and a second part containing ions being directed to a second outlet by a combination of the electric field and the velocity field;

(c) the electric field being created by a set of electrodes with defined voltages that are positioned on internal boundaries of the ion-concentrating chamber to concentrate ions into a smaller cross-section than the cross-section of the inlet to the chamber;

(d) wherein at the second outlet, ions of greater concentration and a smaller flow rate (than the flow rate at the inlet of the ion-concentrating chamber) are directed to the outlet to be used for identification and detection; and (e) wherein the flow rate at the second outlet is either: (i) lower than in the flow rate of the sample at the inlet of the ion pre-concentrator, (ii) equal to zero (in this case the flow rates in the chamber inlet is equal to the flow rate in the first outlet), or (iii) has a negative value (due to the opposite direction as per case (i)) wherein air mass and neutral molecules enter the ion-concentrating chamber via the said second outlet; in the cases (ii) and (iii) ions of analytes are drawn to an ion measuring device only by the electric field and therefore the flow rate in the first outlet is the sum of the sample inlet flow rate and the neutral molecules flow rate in the second outlet.

In another aspect, the invention provides an apparatus for increasing number concentration of molecules in real time from a gaseous mixture of molecules, which apparatus comprises:

(a) an ion-concentrating chamber having a chamber inlet with a defined inlet cross section, and two outlets, and optionally ionisation means (e.g. an ionising device or entity) positioned at or near the chamber inlet for creating ions from the molecules;

(b) an airflow generating and controlling device which can direct a flow of a sample gas (e.g. air) through the chamber inlet at a defined flow rate into the ion-concentrating chamber, wherein the ion-concentrating chamber is configured and set up to divide the sample gas flow into two parts: a first part containing neutral molecules being directed to a first outlet by a velocity field and a second part containing ions being directed to a second outlet by a combination of an electric field and the velocity field;

(c) the electric field being created by a set of electrodes with defined voltages that are positioned on internal boundaries of the ion-concentrating chamber to concentrate ions into a smaller cross-section than the cross-section of the chamber inlet;

(d) the second outlet where ions of greater concentration and a smaller flow rate (than the flow rate at the chamber inlet) being in fluid communication with, or connectable to, a device for further identification and detection of ions;

(e) the apparatus being configured and set up such that the flow rate at the second outlet is either: (i) lower than in the flow rate of the sample gas at the chamber inlet, (ii) equal to zero (in this case the flow rate in the chamber inlet is equal to the flow rate in the first outlet), or (iii) has a negative value, wherein the flow rate in the second outlet is greater than the flow rate of the sample gas in the inlet; in the cases (ii) and (iii) ions of analytes are drawn to an ion measuring device only by the electric field and therefore the flow rate in the first outlet is the sum of the sample gas inlet flow rate and the neutral molecules flow rate in the second outlet.

In another aspect, the invention provides an apparatus for increasing the number concentration of molecules in real time from a sample gas flow containing mixture of molecules; the apparatus comprising:

(a) an ion-concentrating chamber having:

(a-i) an inlet for receiving a stream of sample gas containing molecules of an analyte of interest, the inlet having an inlet cross sectional area, and the stream of sample gas having an inlet flow rate as it enters the inlet;

(a-ii) at least one first outlet through which gas can leave the ion-concentrating chamber; and (a-iii) at least one second outlet through which ionised analyte molecules can leave the ion-concentrating chamber; and (b) optionally an ionising device located at or near the inlet to the ion-concentrating chamber for ionising non-ionised molecules of the analyte of interest; and (c) one or more electric field generating elements for generating an electric field within the ion-concentrating chamber;

(d) the apparatus being connected or connectable to a gas flow controlling device for establishing a (preferably laminar) gas flow velocity field within the ion-concentrating chamber;

(e) the apparatus being configured so that:

(i) the analyte molecules in the sample gas flow, when not already ionised, are ionised by the ionising device;

(ii) the sample gas flow containing ions moves along the chamber under the influence of the velocity field;

(iii) the electric field acts on ionised analyte molecules in the sample gas flow as they pass along the chamber to concentrate the ionised analyte molecules into a reduced cross sectional area smaller than that of the inlet;

(iv) ionised analyte molecules concentrated into the reduced cross sectional area are directed out through the second outlet;

(f) and wherein the apparatus is connectable or connected to a device for detecting and/or identifying and/quantifying ions collected from the second outlet.

In the foregoing aspects and embodiments of the invention, where it is stated that the ionisation means (e.g. an ionising device or entity) is optional, it will be appreciated that where the analyte molecules in the gas flow are introduced into the apparatus in a non-ionised form, or are only partially ionised, or are not ionised to a desired extent, the ionisation means will be present and will be used to create ions from the analyte molecules. However, in circumstances where the analyte is already ionised when it enters the apparatus and it is not desired to bring about any further ionisation of molecules in the sample gas flow, an ionisation means is not used. Thus, an apparatus of the invention can be provided with an ionisation means that can be switched on or off depending upon the nature of the analyte in the sample gas flow. Alternatively, if the apparatus, or method, is only intended to be used to detect and/or identify analyte molecules which are already in ionised form, then an ionisation means can be omitted from the apparatus.

In one subset of methods and apparatuses of the invention as defined herein, the apparatus comprises an ionisation means (e.g. an ionising device or entity).

In another subset of methods and apparatuses of the invention as defined herein, the apparatus does not comprise an ionisation means.

The term term "molecule" is used herein not only to denote a group of two or more atoms, but also to denote "monoatomic" molecules such as the noble gases, single atom free radicals and single metal atoms, and also analyte ions of interest that are monoatomic.

In the method and apparatus of the invention, the concentrated ions together with a proportion of the other components of the sample gas flow are directed to a "second outlet". The remainder of the sample gas flow, from which analyte ions have been largely (although not necessarily completely) removed is directed to a "first outlet". For ease of identification, a "first outlet" may be referred to herein by the synonym "neutral molecule-collecting outlet" whereas a "second outlet" may be referred to herein by the synonym "ion collecting outlet" or "ion collection outlet".

It will be apparent from the disclosure below that there may be more than one first outlet/neutral molecule-collecting outlet and there be more than one second outlet/ion collecting outlet. More usually, however, there will be only a single one second outlet/ion collecting outlet.

The more detailed description of the invention set out below relates to both the methods of the invention and the apparatuses of the invention.

In accordance with the invention, the sample gas flow passing through the chamber is partitioned so that part of the sample gas flow passes out through the ion-collection outlet(s) and the remainder passes out through the neutral molecule-collecting outlet(s). The ion-collecting outlet(s) is located at a position in the chamber such that it receives a part of the sample gas flow that contains the concentrated analyte ions whereas the neutral molecule-collecting outlet(s) is located in a position in the chamber such that it receives a part of the sample gas flow containing few or no analyte ions.

It will be appreciated that since movement of non-ionised molecules and uncharged particles will generally only be affected by the velocity field, and not the electric field, some non-ionised molecules and uncharged particles typically will still pass out of the chamber through the ion-collection outlet. Similarly, some ionised molecules and charged particles may leave the chamber through the neutral molecule-collecting outlet. However, in general, most of the analyte ions will leave the chamber through the ion collection outlet.

The method of the invention typically comprises a further step of directing analyte ions collected through the ion-collecting outlet to a device for detecting and/or identifying and/or quantifying the analyte ions. Such a device can be, for example, an ion mobility spectrometer (IMS, a differential mobility spectrometer (DMS), a differential mobility analyser (DMA), a field asymmetric ion mobility spectrometer (FAIMS), a variable electric field mobility analyser (VEFMA), or a gas chromatograph-mass spectrometer (GC-MS).

It will be appreciated that the gas flow rate into the ion-concentrating chamber will be equal to the aggregate of the individual gas flow rates through each of the outlets.

In one embodiment, the gas flow rate out through the ion-collecting outlet will be less than the gas flow rate into the ion-concentrating chamber and the degree of concentration of the analyte ions will therefore be proportional to the ratio between the gas flow rate into the ion-concentrating chamber and the gas flow rate out through the ion-collecting outlet, assuming that losses of ions inside the chamber are negligible.

In another embodiment of the present invention, the flow rate through the neutral molecule-collecting outlet is equal to the flow rate in the chamber inlet. Therefore, there is no fluid flow through the ion collection outlet and onto the ion detecting device. In this embodiment, ions may be drawn into the detecting device by an electric field only. An advantage of the zero flow rate through the ion collection outlet is that it prevents neutral molecules of analytes and particulate matter from entering an ion detecting/identifying device linked to the ion collection outlet. Neutral molecules and aerosol particles are not affected by the electric field and simply follow the velocity field direction that is in the first outlet. Therefore, only ions come through the second outlet to the detection and identifying means.

In another embodiment, the flow rate through the neutral molecule-collecting outlet is greater than the flow rate in the chamber inlet. Therefore, there is a net fluid flow out of the concentrating chamber. In this case the electric field can be configured to impart a greater velocity to the analyte ions to overcome the velocity of the air coming out of the ion concentrating chamber. This improves the reliability of the ion detecting device by removal of neutral molecules and particulate matter from ions passing through the ion collecting outlet and onwards to a detecting device. It is well recognised that neutral molecules and particulate matter can cause interference with identification and detection of analytes.

The ion-concentrating chamber is provided with means for generating an electric field within the chamber which has the effect of deflecting the ions (e.g. towards the longitudinal axis of the chamber) so that they become concentrated in a zone of reducing width (e.g. radius) as they progress through the chamber. This is an opposite process to Brownian diffusion and therefore makes it possible in practice to achieve concentration of ions.

The means for generating an electric field can take the form of one or more electrodes (typically a plurality) in or on a surface (internal or external if non electrically conductive) of the ion-concentrating chamber.

For example, the electric field can be generated by a plurality of electrodes or coplanar electrode arrays mounted on or in a surface of the ion-concentrating chamber wherein the electrodes or coplanar electrode arrays are spaced apart in an axial (x) direction along the chamber.

The surface in or on which the electrodes are mounted can be an inner surface of the ion-concentrating chamber, or an outer surface of the ion-concentrating chamber, or both.

In one embodiment, all of the electrodes are mounted on an inner surface of the ion-concentrating chamber.

In another embodiment, one or more electrodes are mounted on an inner surface of the ion-concentrating chamber and one or more electrodes are mounted on an outer surface of the ion-concentrating chamber. In this embodiment, the electrodes may be mounted predominantly on the inner surface.

At a given axial (x) location, an electrode can be a single electrode which extends around the inner surface of the ion-concentrating chamber and therefore has a shape corresponding to the cross section shape of the ion-concentrating chamber. For example, where the ion-concentrating chamber is cylindrical and has a circular cross section, an electrode at a given x location can take the form of a ring or annulus extending around the circumference of the chamber. Alternatively, if the ion-concentrating chamber has a rectangular cross section, the electrode at a given x location can also have a rectangular shape.

The term "coplanar electrode array" as used herein refers to a plurality of electrodes located at the same axial (x) location in the ion-concentrating chamber and hence lying in the same plane (the y-z plane), which plane is orthogonal to the longitudinal (x) axis of the ion-concentrating chamber. For example, where the ion-concentrating chamber is cylindrical and has a circular cross section, a coplanar electrode array can comprise a plurality of electrodes arranged as a discontinuous ring around the circumference of the ion-concentrating chamber. Similarly, if the ion-concentrating chamber has a rectangular cross section, the coplanar electrode array can be arranged as a discontinuous rectangle extending around the surface of the ion-concentrating chamber.

The electric field can be generated by a 2, 3, 4, 5 or more electrodes or 2, 3, 4, 5 or more coplanar electrode arrays mounted on or in a surface of the ion-concentrating chamber wherein the electrodes or coplanar electrode arrays are spaced apart in an axial (x) direction along the chamber.

Typically, the electrodes are spaced apart by regions of electrical insulator material, such as a plastics material, a composite material, glass or a ceramic material.

The voltage settings for the electrodes typically gradually change along the length of the ion concentrating chamber in such a way as to establish a non-linear gradient for the electric potential inside the chamber which increases gradually with distance along all or part of the length of the chamber.

It will be appreciated that in order to achieve an increase in ion concentration, it is necessary to set voltages at the surfaces of the ion-concentrating chamber that gradually convolute ions by moving the ions together. Thus, the electrode voltages are typically set so as to bring about progressive lateral constriction of an ion cloud as it moves through the ion-concentrating chamber. The nature of the lateral constriction will depend on the geometry of the chamber and the arrangement of the electrodes. Thus, depending on the geometry of the chamber and the arrangement of the electrodes, the ion cloud may be laterally constricted to an equal extent along both the y and z axes, or the ion cloud may be laterally constricted to differing extents along the y and z axes.

For example, when the ion-concentrating chamber is of circular cylindrical shape and the electrodes are circular and surround the x-axis, the ion cloud may be laterally constricted to an equal extent along both the y and z axes. In this case, the set-up of the electrodes may be such as to bring about convergence of the ion cloud towards the ion-collecting outlet.

Where the geometry of the chamber and the arrangement of the electrodes are such that the ion cloud is laterally constricted to differing extents along the y and z axes, in one embodiment the ion cloud is only constricted to any significant extent along one of the y and z axes in which case the method of the invention can be considered as being a two dimensional (2D) (x and y axes, or x and z axes) ion-concentrating method. Therefore, in a 2D concentration device, a circular or rectangular cross-section of an ion cloud at the inlet is reduced to a narrow shape, ideally close to a line.

Where the geometry of the chamber and the arrangement of the electrodes are such that the ion cloud is laterally constricted along each of the y and z axes, the method of the invention can be considered as being a three dimensional (3D) (x, y and z axes) ion-concentrating method.

It should also be appreciated that a combination of 3D and 2D sections is considered to be beneficial for some applications.

It is advantageous to change voltages at the electrodes gradually along the distance from the inlet of the ion-concentrating chamber to the ion-collecting outlet. The voltage can be changed along the length of the ion concentrating chamber (the x-axis) in such a way as to provide a voltage gradient that can remain constant or can increase or decrease with distance along the x-axis.

The voltage gradient can be estimated as $dV/dX=\Delta V/\Delta X$, where $dV/dX$ is the gradient of the electric potential, $\Delta V$ is the voltage difference between two axially (x axis) adjacent electrodes and $\Delta X$ is the axial (x axis) gap constituted by regions of electrical insulator between the electrodes. It will be appreciated that an analytical representation of the $dV/dX$ function of X can be either a linear, convex or concave line.

In one particular embodiment of the present invention, the voltages applied to the electrodes are gradually changed along the x-axis in such a way that the degree of the change (gradient) gradually increases with distance along the length of the ion-concentrating chamber.

The voltages applied to the electrodes are defined by the geometry of the chamber and the required degree of concentration of the analyte ions. However, normally the voltage difference between neighbouring electrodes should be lower than the breakdown voltage (~30,000 V/cm). Typically, the voltage difference between two neighbouring electrodes ($\Delta V$) is in the range from 0 to $\Delta V/\Delta X=30,000$ V/cm, where $\Delta X$ is the distance between neighbouring electrodes. A person skilled in the art should be able to find voltages that enables concentrating ions in the chamber.

It should be noted that, in some sections of the chamber, the electric field strength can be greater than 30,000 V/cm. For example in the ionisation section (near the sample inlet), if a spark generating means is employed, an electric field strength can and often must be above the breakdown level at least at some time (e.g. in the case of a frequency modulated spark discharge).

The ion concentration chamber is typically an elongate chamber; i.e. it has a length which is greater than its width.

The ion concentration chamber can have one of a variety of shapes.

For example, it can have side walls that are parallel to a longitudinal axis of the chamber. It can be, for example, of a circular cylindrical shape where there is only a single side wall and the radius measured from the longitudinal axis is substantially constant along the length of the chamber.

The ion concentration chamber can have a cross-section which is elliptical (e.g. circular), oval, rectangular (e.g. square or oblong), or in the shape of other regular or irregular polygons such as a triangle, pentagon, hexagon, heptagon, octagon or other polygon with a number of angles in the range from 3 to 125.

The cross-section area of the chamber can remain substantially constant along the length of the chamber, or it can decrease or increase with the distance from the inlet to the outlets. The chamber can have a plurality of sections where the cross-section area increases or decreases to improve concentration efficiency of the chamber.

In one embodiment, the cross section area of the ion concentration chamber is substantially constant along the greater part (or substantially all) of the length of the chamber.

In another embodiment, the cross section area of the ion concentration chamber at an upstream end thereof (i.e. adjacent the inlet) is larger than the cross section area at a downstream end thereof (i.e. adjacent or close to the outlets.

In this embodiment, the cross section area of the ion concentration chamber may decrease in a linear or non-linear manner with distance along the chamber.

Thus the walls of the chamber may be convergent from an upstream end to a downstream end.

In one embodiment, the shape of the ion concentration chamber is either formed from parallel planes (prisms) or it can be formed as a pyramid. For the latter the cross-section area of the chamber decreases with the distance from the inlets to the outlets.

According to the method of the invention, the analyte molecules are ionised and the sample gas flow containing the ions is then subjected to both electric and velocity forces in the ion concentration chamber so that the ions become concentrated in smaller space (e.g. a space of reduced cross section compared to the cross section of the chamber. The concentrated ions in the smaller space leave the chamber through the ion-collection outlet.

Where the shape of the ion concentrating chamber and the set-up of the electric field are such that the analyte ions are concentrated in a region having the longitudinal axis of the chamber as a mid-point or centre point, the ion collection outlet is typically aligned with the longitudinal axis. Thus, the ion collection outlet may be located in a downstream end wall of the chamber.

The ion collection outlet may have the same or similar dimensions in the y and z axial directions (i.e. orthogonal to the longitudinal x axis). For example, the ion collection outlet may be substantially circular or substantially rectangular.

Alternatively, particularly when the ion cloud is constricted to different extents in the y and z axis directions, the ion collector outlet may have correspondingly different dimensions in the y and z directions. For example, when the ion concentration chamber is set up for operation in the 2D mode, the ion collection outlet may take the form of an elongate transverse slot in a downstream end wall of the chamber, wherein the elongate slot can be, for example, centred on the x-axis and can extend transversely in either the y or z directions.

Typically, there is only a single ion collection outlet (although a plurality of outlets can be used if desired).

The neutral molecule-collection outlets are typically arranged laterally with respect to the ion collection outlet. Thus, for example, one or more neutral molecule outlets can be provided in a side wall of the ion concentration chamber at or near a downstream end thereof. Alternatively or additionally, one or more neutral molecule-collection outlets may present in a downstream end wall of the ion concentration chamber but arranged laterally (e.g. radially outwardly) with respect to the ion collection outlet.

In one embodiment, the ion concentration chamber is provided with a plurality of neutral molecule-collection outlets at spaced apart locations around a side wall (e.g. circumference where the chamber is of circular cross section) of the chamber.

In another embodiment, a single neutral molecule-collection outlet is provided that is in the form of a slot aligned with the y-z plane and extending around the inner surface of the chamber.

The neutral molecule-collection outlet(s) may be linked to a flow distributor or flow homogenising chamber from which the sample gas flow can be vented to the atmosphere or can be recycled to the inlet, in each case optionally via a filter to remove particulate materials and other unwanted substances before recycling or atmospheric discharge.

The flow distributor chamber can surround the ion concentrating chamber and can define a continuous volume into which each of the neutral molecule-collection outlets empties.

In one embodiment, the ion concentrating chamber is provided with a plurality of neutral molecule-collection outlets, two or more (e.g. all) of which are linked to a common flow distributor chamber surrounding the ion-concentrating chamber.

In another embodiment, the ion concentrating chamber is provided with a neutral molecule-collection outlet in the form of a slot aligned with the y-z plane and extending around the inner surface of the ion concentrating chamber, and the slot communicates with a flow distributor/homogenising chamber surrounding the ion concentrating chamber.

In this embodiment, when the ion concentrating chamber is of circular cylindrical form, the flow distributor chamber can be an annular (ring-shaped) chamber surrounding the ion concentrating chamber.

It should be understood that ion detecting devices connected to the ion concentrating apparatus of the invention do not generally require additional ionisation means. For example, the ion concentrating apparatus can be directly connected to an IMS or MS without using any ionisation means. However, if the flow of sample gas through the inlet of the ion concentrating chamber is greater than the flow out of the chamber through the neutral molecule-collecting outlet, an ionisation means in the detecting device may generate some more ions and increase ion concentrations further.

The ionising entity which ionises the molecules of interest to form analyte ions can take various forms.

For example, in one embodiment the ionising entity comprises an X-ray source.

In another embodiment, a corona discharge electrode is used at the inlet to the ion concentration chamber to ionise analyte molecules. It is also should be understood that a plurality of corona electrodes can be used to ionise analytes.

In a further embodiment, a spark discharge electrode is used at the inlet to the ion concentration chamber to ionise analyte molecules.

In another embodiment, a UV source positioned near the inlet to the ion concentrating chamber can be used to ionise molecules of interest in a sample. Additionally, a radioactive source, e.g. $^{63}$Ni, or arc discharge can be used to ionise the sample.

It should also be understood that a plurality of spark electrodes can be used to ionise analytes. It should be also understood that in respect of each of the above mentioned ionisation means, a plurality of sources (X-ray, UV, Corona, arc discharge, radioactive source, chemical ionisation and combinations thereof) may be used.

A grid may advantageously be placed at the entrance to the ion-concentrating chamber, the grid being capable of having an electric potential applied to it so as to reduce the residence time of ions in the chamber. The grid is typically formed from a metal and can have openings of a size typically in the range from 10 μm up to 20% of the largest dimension of the sample inlet cross-section, and more usually from 20 μm up to 5% of the largest dimension of the sample inlet cross-section. The grid can take the form of a metal plate having an array of holes through which ions can pass. Alternatively it can take the form of a woven metal mesh having holes of a size in the range from 10 μm up to 20% of the largest dimension of the sample inlet cross-section. By way of example, the largest dimension of the sample inlet cross section can be from 10 μm up to 100 m. The presence of a grid is particularly beneficial when there are molecules in the air (or other gas) that are more easily ionised than analyte molecules.

Prior to or during exposure to the ionising entity to form analyte ions, the sample gas flow can be heated to desorb or release any analyte molecules than may have been adsorbed onto or absorbed into aerosol particles in the sample gas flow. Thus a heating means such as a heater can be located at or near to the inlet to the ion concentration chamber. It is well known that atmospheric aerosol particles can adsorb and absorb VOCs and SVOCs thereby depleting their concentrations in the gas phase. Heating the sample gas flow before it reaches the ionisation zone, or even within the ionisation zone, addresses the issue of the depletion of analyte vapour concentration caused by aerosol particles and thereby increases the ion yield as well as the sensitivity of detection.

In order to increase the sensitivity of detection of analyte ions, one or more dopants may be added to the sample gas flow prior to entry into the ion concentrating chamber in order to decrease the concentrations of reactant ions and/or to increase the extent of ionisation of the analyte. The use of dopants in increasing the sensitivity of ion mobility spectrometers is well known. The selection of a suitable dopant will depend on the nature of the analyte and the type of ionising entity used to form the analyte ions, and hence the nature of interfering reactant ions. Ketones such as acetone have been used as dopants to improve IMS sensitivity—see for example Cheng et al. who describe the use of acetone as a dopant in the IMS detection of explosives such as common explosives including ammonium nitrate fuel oil (ANFO), 2,4,6-trinitrotoluene (TNT), N-nitro-bis-(2-hydroxyethyl) amine dinitrate (DINA), and pentaerythritol tetranitrate (PETN). Nitrogen oxide has also been used as a dopant for improving the sensitivity of IMS detection of aromatic compounds (see Gaik et al.).

The extent of concentration of the analyte ions in an electric field of a given field strength will be limited by the strength of repulsive forces between ions of the same charge sign. This limit is known as the volume charge limit. Reactant ions (such as $N_2^+$ and $O_2^+$) formed by ionisation of molecules other than the analyte in the sample gas stream can act to reduce the volume charge limit for the analyte ions and the removal of the reactant ions by the use of dopants can therefore increase the extent of concentration of the analyte ions.

In another embodiment of the invention, a low-resolution ion selecting device can be used in combination with two real-time ion-concentrators of the invention. In this arrangement, the first ion-concentrator concentrates ions to a certain degree when repulsive forces do not affect the ion concentrations (the volume charge limit). The outlet of the first ion-concentrator is connected to a low resolution ion selecting device (e.g. a Differential Mobility Analyser DMA or a Differential Mobility Spectrometer DMS) where reactant ions are removed from the sample flow and the flow with or without substantially reduced presence of reactant ions is directed to the second ion concentrator where ions of interest can be concentrated further. In this way the degree of concentration can be considerably higher that the degree of ion-concentrating according to the volume charge limit.

It should be understood that a plurality of ion concentrating apparatuses of the invention can be connected sequentially to increase the sensitivity further, or in parallel for simultaneous multichannel detection. These ion-concentrating apparatuses can be of cylindrical, rectangular shape and/or may be provided in 2-dimensional (2D) or 3-dimensional geometries.

In another embodiment, two or more 2D ion-concentrators can be arranged in such a way that the first concentrator concentrates ions in the X-Z plane from a rectangular inlet to a narrow strip as close as practical to the volume charge limit. Thus, in the first ion-concentrator, the ion cloud reduces in thickness along the Z axis while it is moving along the X axis. In the second ion-concentrator, the ion cloud is substantially squeezed in another plane, e.g. the X-Y plane. The second concentrator therefore reduces the thickness of the ion cloud along the Y axis while the ion cloud is moving along the X axis. At the ion collection outlet of the second concentrator, the ion concentration can be increased and the dimensions of the ion cloud coming out of the second ion-concentrator can be optimised for a given an ion analysing instrument.

The methods and apparatuses of the invention can be used in combination with a number of different analytical instruments in order to facilitate quantification of low analyte concentration and decreasing the LOD. Thus, the methods or apparatuses of the invention as defined herein wherein an ion-concentrator or the last in a train of ion-concentrators (if more than one used) can be used in combination with (e.g. by connection of the ion-concentrator to) an instrument for quantifying and/or identifying ions and their concentrations. Examples of such an instrument include: an Ion Mobility Spectrometer (IMS), a differential mobility spectrometer (DMS), a Differential Mobility Analyser (DMA), a Field Asymmetric Ion Mobility Spectrometer (FAIMS) and a Variable Electric Field Mobility Analyser (VEFMA) (e.g. as disclosed in U.S. Pat. No. 8,378,297B2).

It should be noted that an ion concentrator can be connected to a GC via an interface where concentrated ions are neutralised before entering the GC, for example with a neutraliser (e.g. X-Ray) or with a single (opposite) polarity ionising device. For this a sample of a gas with an analyte is concentrated first in an apparatus according to the invention, following which the sample is neutralised in a neutralisation chamber (well known in aerosol science) and, finally, the sample is directed to a GC to be analysed. It should also be understood that GC-MS and GC-IMS may also benefit from the concentration of a sample in accordance with the invention.

In another aspect, the invention provides a real-time sample ion-concentrating apparatus for increasing number concentrations of molecules of interest in a 2D concentrating geometry, the apparatus comprising:

(a) an ion-concentrating chamber with a substantially rectangular cross-section sample inlet, and first and second outlets;

(b) a pump connected to a first outlet such that a flow of air containing trace amounts of molecules of interest (e.g. analyte) entering the ion-concentrating chamber via the sample inlet is drawn through into the ion-concentrating chamber at a pre-determined sample inlet flow rate and through the ion-concentrating chamber towards the first outlet;

(c) an Ionising entity (e.g. an X-ray source) for ionising molecules in the flow of air at or near the sample inlet to produce an ion cloud containing ionised molecules of interest (analyte ions);

(d) a set of electrodes placed on opposite sides of the rectangular chamber with predetermined voltages that are arranged in such a way as to produce an electric field which can act on the ion cloud to reduce the size of the ion cloud along one line (e.g. along a Z-axis) which is perpendicular to the electrodes thereby to increase ion concentration substantially in a 2D plane (e.g. X-Z plane), where axis X is the direction of the sample flow) and leaving the size of the ion cloud in an orthogonal dimension (e.g. along a Y-axis) substantially unchanged;

(e) the second outlet having a rectangular elongate cross-section through which the ion cloud containing increased concentrations of ions is mainly directed by the electric field, wherein the second outlet is in fluid communication with an ion measuring device that quantifies ion number concentrations, and;

(f) wherein the apparatus is configured to operate such that the air flow rate at the second outlet is:

(i) lower than in the flow rate of the sample at the inlet of the ion pre-concentrator;

(ii) equal to zero (in this case the flow rates in the chamber inlet is equal to the flow rate in the first outlet), or;

(iii) of a negative value wherein air mass and neutral molecules enter the ion-concentrating chamber at a flow rate ("negative flow rate") via the said second outlet;

whereby in cases (ii) and (iii) ionised molecules of interest (analyte ions) are drawn to the ion measuring device only by the electric field and therefore the flow rate in the first outlet is the sum of the sample inlet flow rate and the negative flow rate through the second outlet.

In cases (ii) and (iii) above, where ionised molecules of interest (analyte ions) are drawn to the ion measuring device only by the electric field, they are transferred to an ion measuring device by moving in a stagnant gas (ii) or against the gas flow coming out of the measuring device. It will be appreciated that the velocity of ions should be greater than the velocity of molecules in the oncoming flow.

In the foregoing aspect of the invention, the first outlet may be referred to alternatively as the neutral molecule collecting outlet, and the second outlet may be referred to alternatively as the ion-collecting outlet.

In each of the aspects and embodiments of the invention as described herein, unless the context indicates otherwise, the electric potential differences between the electrodes (e.g. electrodes mounted in or on an internal surface of the ion concentrating chamber) can:

(a) gradually change along the length of the ion-concentrating chamber;
(b) gradually increase along the length of the ion-concentrating chamber;
(c) gradually increase in the entire length of the ion-concentrating chamber chamber or at least in a part of the chamber length;
(d) increase along the length of the ion-concentrating chamber in such a way as to progressively increase a voltage gradient therein in accordance with the estimation $dV/dX=\Delta V/\Delta X$ where $dV/dX$ is the gradient of the electric potential inside the ion concentrating chamber, $\Delta V$ is the voltage difference between two adjacent electrodes and $\Delta X$ is a gap defined by the presence of an electrical insulator between the electrodes;
(e) form a geometric progression where $\Delta V$ is proportional to $n^m$: $\Delta V \sim n^m$ where n and m are real numbers;
(f) be described by a function of X (where X is the axis along the length of the chamber) $\Delta V=F(X)$ wherein the said function is a combination of concave, convex, constant and linear sections;
(g) be any combination of (a) to (f).

In another embodiment of the invention, there is provided an apparatus wherein the voltages applied to the electrodes in the ion-concentrating chamber are selected so as to form a cross-section of the ion cloud near the second outlet (for example in the Y-Z plane if the air moves predominantly along X-axis) that:

(i) is similar to the cross-section of the air flow in the sample inlet (3D ion-concentrating);
(ii) is not similar to the cross-section of the air flow in the sample inlet (3D "free style" ion concentration);
(iii) is substantially deformed in such a way that along one axis of the cross-section, e.g. Z-axis, the ion cloud is much narrower than the variation in the size of the ion cloud along the other axis Y-axis (2D ion-concentrating).

In a further embodiment of the invention, a cylinder is used as the ion concentrating chamber. In this case, the flow of air containing molecules of interest moves along the axial symmetry line (x-axis).

Further embodiments and aspects of the method and apparatus of the invention will be apparent from the drawings FIGS. 1 to 15 and the specific embodiments described below with reference to the drawings.

DETAILED DESCRIPTION OF THE INVENTION

Figure 1:
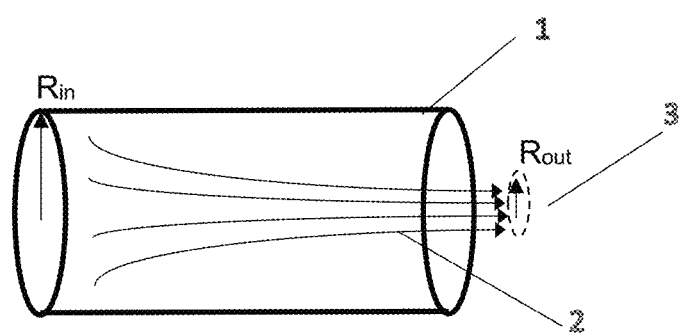
FIG. 1 is a schematic illustration showing ion trajectories focused together by an electric field in a cylinder.

FIG. 1 illustrates schematically the effect of an electric field on a stream of ionised analyte molecules moving through a cylindrical chamber. As shown in in FIG. 1, the cylindrical chamber (1) has an electric potential on its internal surface that generates a radial electric force directed towards the axial symmetry line. The radial component of the electric force affects the trajectories of ions (2) so that they are "squeezed together" in a smaller space (3). If, at the inlet of the cylindrical chamber, the radius of the ion cloud is $R_{in}$, then at the outlet of the cylinder the ion trajectories (2) are squeezed together so that the ion cloud has a smaller radius $R_{out}$. In the cylindrical chamber the average flows in the inlet and outlet are equal to one another. If, for simplicity, the velocity profile along the radius of the cylindrical chamber is discounted, then the concentration of ions in the central area of the outlet marked as a dashed circle $R_{out}$ is greater than the concentration of ions in the inlet (where radius is $R_{in}$) by the ratio of $(R_{in}/R_{out})^2$. The local concentration of ions is defined by the degree of compression of the ion cloud while ions are constantly transported along the axial symmetry line of the cylindrical chamber. This local concentration increase forms a non-uniformity in the ion concentration profile. However, the global concentration averaged across the entire cross-section of the outlet is the same as the ion concentration in the vicinity of the inlet. Therefore the cylindrical chamber shown in FIG. 1 does not act as an ion-concentrating device.

Figure 2:
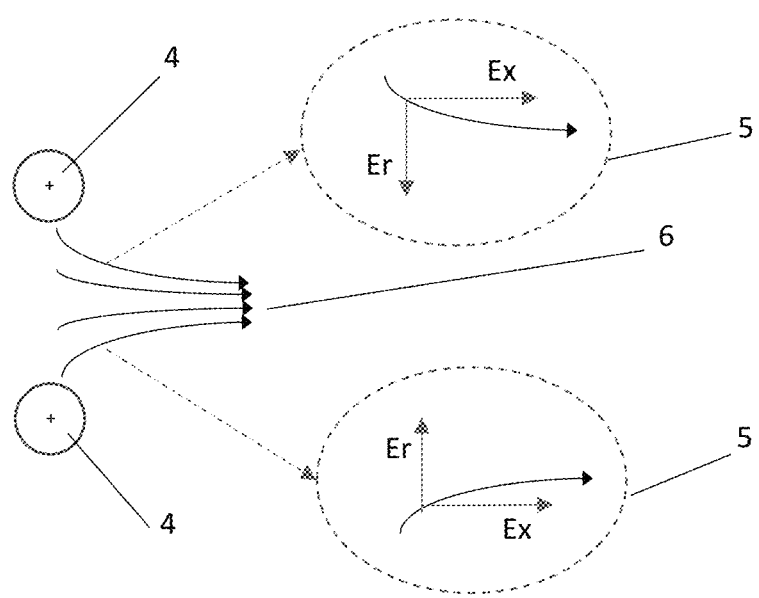
FIG. 2 is a schematic illustration of the focusing of ions in a simple metal ring to which a positive voltage has been applied.

The concept of ion focusing is well known and widely used in electron microscopy. A simple focusing device is schematically shown in FIG. 2 where a positively charged ring (4) shown as a cross-section of two circles marked with the symbol "+". The charged ring (4) generates an electric field that has two components: first—an electric field along the axial symmetry line of the ring Ex (5) and second—an electric field along the radius of the ring Er (5). The component Er of the electric field squeezes the ion trajectory bundles (6) together reducing the distance between the ions (6). This example is shown for positive ions. In the case of negative ions, the ring (4) should be charged negatively. The arrangement shown in FIG. 2 works well in a vacuum but a majority of the devices used for airport security and border control applications operate at atmospheric pressure, rather than under vacuum, and therefore a different approach than simple ion focusing is needed for such applications.

Figure 3:
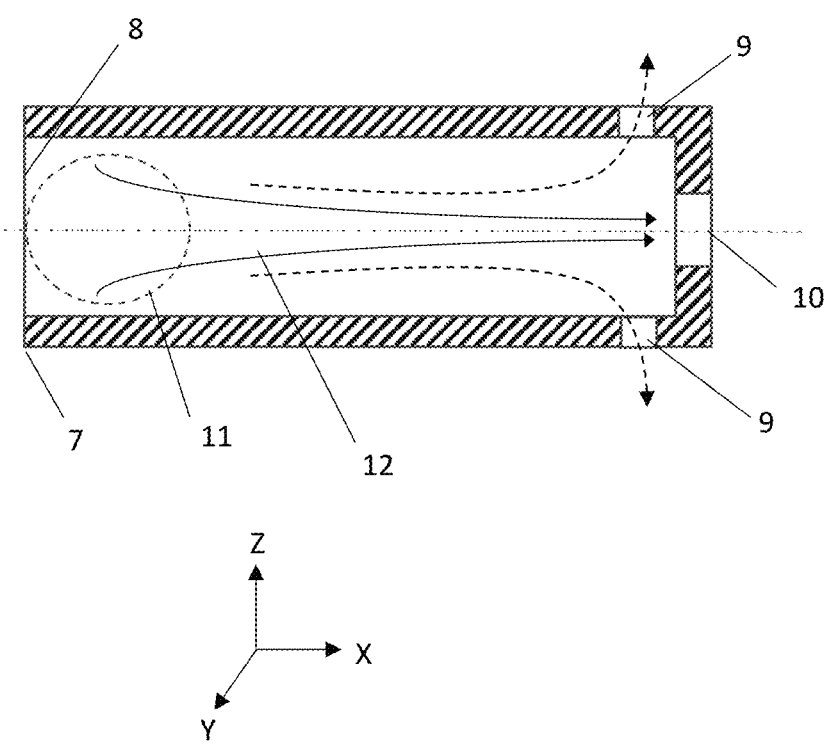
FIG. 3 is schematic side sectional view of an apparatus according to a first embodiment of the invention.

FIG. 3 illustrates schematically an apparatus according to a first embodiment of the invention. FIG. 3 shows a Z-X cross-section of an ion-concentrating chamber (7) having a cylindrical symmetry. The chamber (7) is provided with means (not shown) for generating an electric field inside the chamber that convolutes or radially constricts ion trajectories into a smaller zone. The chamber has an inlet (8) through which a sample of air or other gas laden with analyte can be introduced into the chamber (7). At the opposite end of the chamber (7), there are provided a pair of first outlets (9) through which air (or other gas), aerosol particles and neutral analyte molecules can leave the chamber, and a centrally disposed second outlet (10) through which air (or other gas) containing concentrated ions can leave the chamber for onward passage to an ion detector.

The electric field inside the chamber is created by an array of one or more (usually more than one) electrodes that can be located in or on an internal surface of the ion-concentrating chamber and/or on an outer surface of the ion-concentrating chamber.

In order to bring about radial constriction of the ion cloud as it moves along the chamber, the strength of the electric field varies with position along the chamber Typically, the voltage settings for the electrodes (e.g. electrodes in or on an internal surface of the chamber)) gradually change along the length of the ion-concentrating chamber (X-axis) in such a way that the gradient of the electric potential inside the chamber $dV/dx=E_x(X,Y,Z)$ is substantially a non-linear function (concave or concave shape) and increases gradually over at least a part if not all of the entire length of the chamber.

The electric field can be non-linear along the whole of the length of the chamber, or one or more (e.g. a plurality) of such non-linear potential sections can be combined with (e.g. interspersed with) linear or constant electric field strength sections.

In FIG. 3, the chamber (7) is shown as having two "first" outlets (9) for air (or other gases). However, it should be understood that the number of "first outlets" can be from 1 to any practical number, e.g. 100, that is possible to accommodate for a given diameter of the outlets and the circumference of the cylindrical chamber (7). In one embodiment, the first outlet can take the form of a circular slot extending around the circumference of the chamber (7).

The difference between ion focusing in a vacuum and real-time ion-concentrating at atmospheric pressure can be seen in FIGS. 1, 2 and 3. The ion-concentrating ratio for the embodiment shown in FIG. 3 is defined as the ratio of the air flow rate at the inlet (8)–Qin to the flow rate in the second outlet (10)–Qout. For example, if Qin=10 l/min and Qout=0.1 l/min, then the ion-concentrating ratio is 100. Thus, it is the removal of unwanted air mass along with aerosol particles and non-ionised analyte molecules through the first outlet(s) that enables the ion-concentrating of ionised molecules to be achieved.

The mode of action of the apparatus shown in FIG. 3 is based on the combined effects of a non-linear electric field and a velocity field. A flow of sample gas (e.g. air) containing molecules of analyte enters the inlet (8) of the ion-concentrator body (7). Ions are then formed in zone (11) (schematically depicted with a dashed ellipse) by exposing the analyte to an ionisation device (not shown). Along the internal surface of the ion pre-concentrator chamber an electric potential is applied to generate a radial electric field Er that squeezes ion trajectories (12) together thereby reducing the Y-Z cross-section of the ion cloud. This creates an ion cloud of smaller radius than the radius of the ion cloud near the inlet (8). The flow of air containing concentrated ions is directed to an ion detecting device (not shown) through "second outlet" (10). Neutral (non-ionised) molecules of air and analytes as well as particulate matter leave the chamber through the "first" outlet(s) (9); their trajectories are shown schematically by means of the arrow-headed dashed lines.

It is important to note that the diameter of the second outlet (10) does not influence the increase in concentration of ions. The concentration of ions is equal to the number of ions divided by the volume of the air (or other gas) in which the ions are dispersed. If it is assumed for simplicity that all ions generated in zone (11) reach the second outlet (10), then the increase in concentration is equal to the ratio of Qin/Qout, where Qin is the flow rate of the sample entering the real-time ion-concentrator via inlet (8) and Qout is the flow rate of the air sample coming out of the second outlet (10). According to the conservation law, Qin=Qout+Qone, where Qone is the flow rate through the first outlet (9). Thus, the ion-concentrating ratio Qin/Qout=1/(1−Qone/Qin) and the real-time ion-concentrating increases when Qone is getting close to Qin.

It should be understood that the above expression for the ion-concentrating ratio is an approximation for the case when the ion velocity is mainly controlled by the flow in the outlet (10) and a contribution from the electric field can be neglected. It becomes clear if one considers the case where Qout is equal to zero, in which case the ion-concentrating ratio becomes infinitely large; which is obviously impossible.

Figure 4:
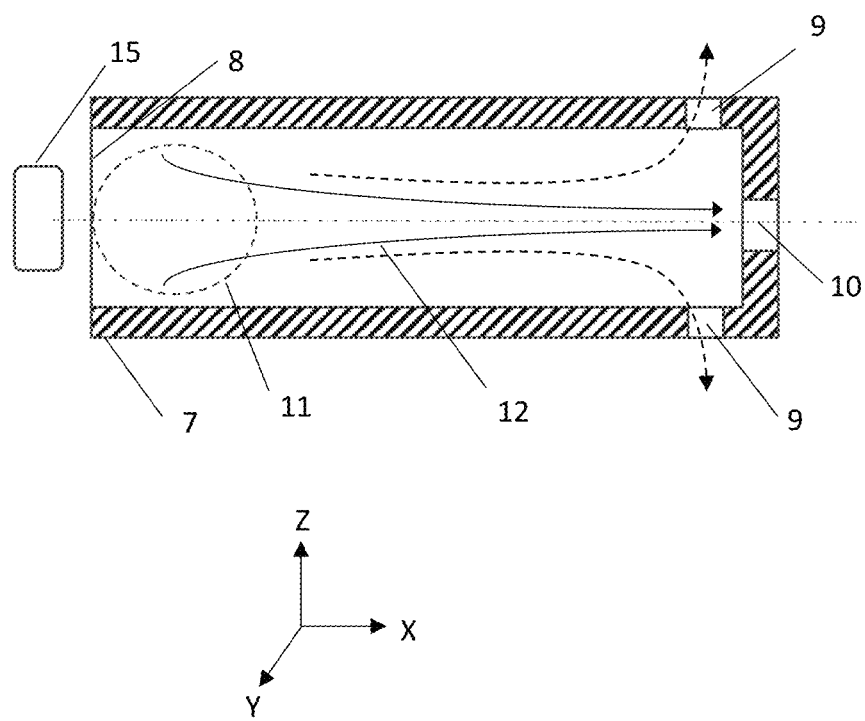
FIG. 4 is a schematic side sectional view of the embodiment shown in FIG. 3 but with an ionisation device shown at the inlet of the ion-concentrating chamber.

In FIG. 4, an embodiment of the present invention is shown with an X-Ray source (15) mounted at the inlet of the ion-concentrating chamber (7). The source (15) generates ions in the zone (11) shown schematically with a dashed ellipse.

Figure 5:
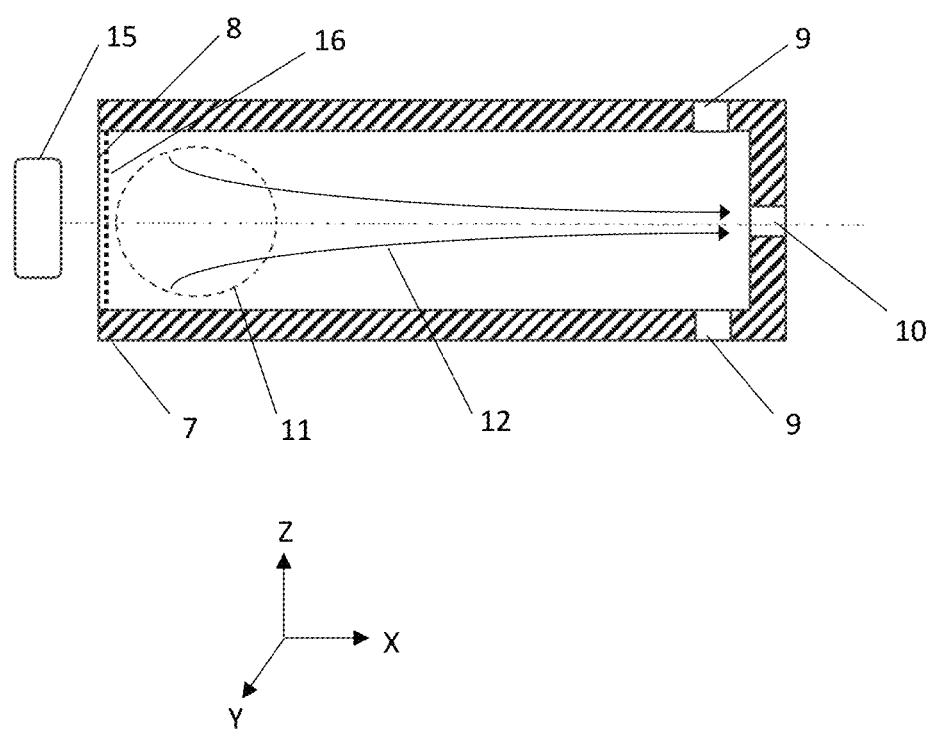
FIG. 5 is schematic sectional view of a further embodiment of the invention which is similar to the embodiment shown in FIG. 4 but has a grid positioned between the ionisation device and the inlet of the ion-concentrating chamber.

It can be advantageous to the performance of the apparatus to position a grid (16) between the X-Ray source (15) and the ion-concentrating chamber (7) as shown in FIG. 5. Note that in FIG. 5, the trajectories of the neutral (non-ionised) molecules are not shown. In practice, the grid (16) is located at the entrance to the chamber (7) and a particular electric potential is applied to the grid. The grid adds an additional electric field Ex in the chamber (7) that increase velocity of ions and decreases the residence time of ions in the said chamber (7).

It should be noted that the ionisation zone (11) is the zone where ionisation of analyte molecules mainly takes place. Reactive ions such as $N_2^+$ and $O_2^-$ are also formed by ionisation of the component gases of air. Such ions are typically formed close to the X-Ray source and some of them subsequently transfer their charge to the analyte.

In the apparatuses shown in FIGS. 3, 4 and 5, the ion-concentrating chambers (7) are of a circular cylindrical shape. However, other shapes are possible. The ion-concentrating chambers can, for example, have rectangular (e.g. square or oblong) or elliptical crosssections as well as a combinations of these shapes.

Figure 6A:
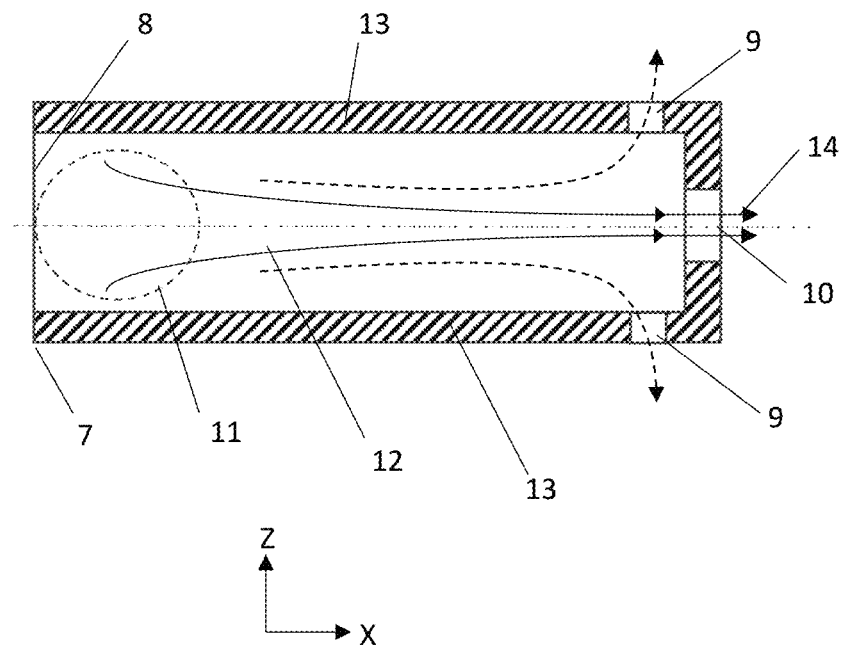
FIG. 6*a* is a schematic side sectional Z-X view (vertical cross-section) of an apparatus according to an embodiment of the invention wherein the ion-concentrating chamber has a rectangular cross section.

FIG. 6a shows an X-Z cross-section of a three-dimensional (3D) ion-concentrating apparatus having a rectangular cross-sectioned chamber (7). The apparatus shown in FIG. 6a can be considered as a 3D rectangular device or as a 2D device. The 2D device version is a simplified approximation of the 3D geometry when the width of the rectangular ion-concentrating chamber (7) in, e.g. the Y-axis (FIG. 6b), is substantially greater than the height of the chamber (7) along the Z-axis. In this approximation the side effects of the X-Z boundaries at smallest and largest co-ordinates along the Y-axis (Y=Y min and Y=Y max) are disregarded. The mode of action in the 2D case is similar to the mode of action in the 3D case but the shape of the second outlet (10) is different because in the 2D case the ion cloud trajectories (12) at the outlet are predominantly squeezed together only in one direction—along the Z-axis. This is shown schematically by the differences in dimensions of the outlets (10) in FIG. 6a and FIG. 6b.

It will be noted that, conceptually, for a 2D version of the apparatus, all the vertical crosssections of ion trajectories (12) are identical and they are not influenced by an electric field component along the Y-axis. In a 3D version of ion-concentrating apparatus ion cloud trajectories are deformed along both the Y-axis and the Z-axis. This is a conceptual difference between two rectangular geometry versions of the apparatus.

Figure 6B:
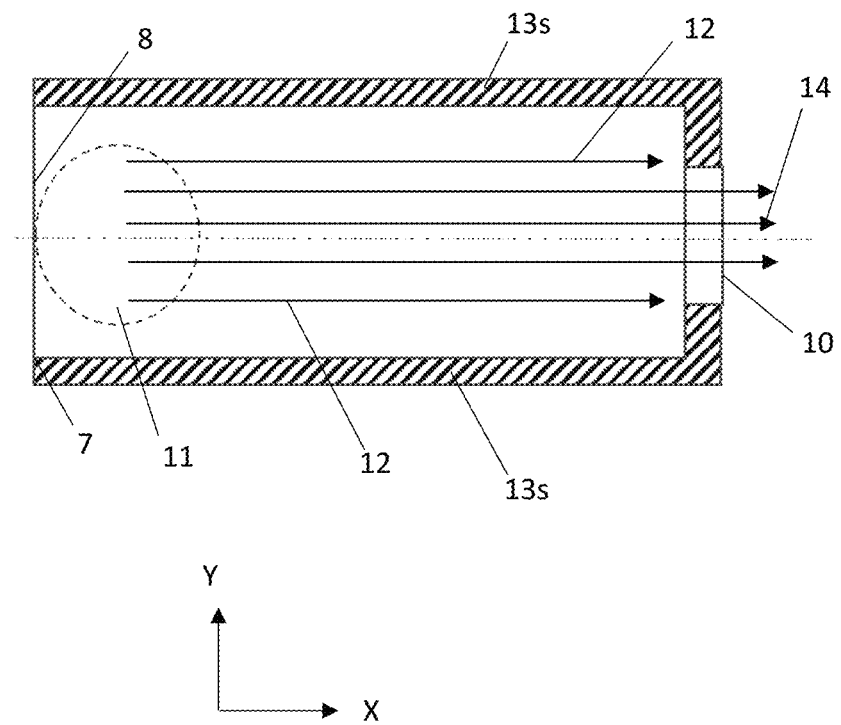
FIG. 6*b* is a schematic sectional top (horizontal cross-section) Y-X view of the apparatus of FIG. 6*a*.

In the embodiment shown in FIGS. 6a and 6b, the chamber (7) has two first outlets (9) through which the non-ionised analytes and the mass of neutral gas molecules can leave the chamber. These outlets are located in the top and the bottom walls (13) and they are formed with substantially rectangular shapes, FIGS. 6a and 6b.

In order to reduce the influence of side effects on the performance of the ion-concentrator having the rectangular cross-section, the Y-dimension of the outlet (10) should be slightly narrower than the internal Y-dimension of the chamber (7) as shown in FIG. 6b. This stops some ions (12) that are near the side walls (13s) from coming out of the outlet (10) but still allows ions (14) to be directed through the outlet (10) to the ion measuring device. It may slightly reduce the number of ions in the outlet (10), but it allows ions with the same residence time to come out of the outlet (10). The residence time near the side walls would be greater due to the boundary conditions on the internal boundaries (13s): v=0. In some cases, an increase of the residence time is not desirable due to ion chemistry that may modify or deplete analyte ions. The above combination of features gives an apparatus which is close to an ideal 2D version of an ion-concentrating device.

Figure 7:
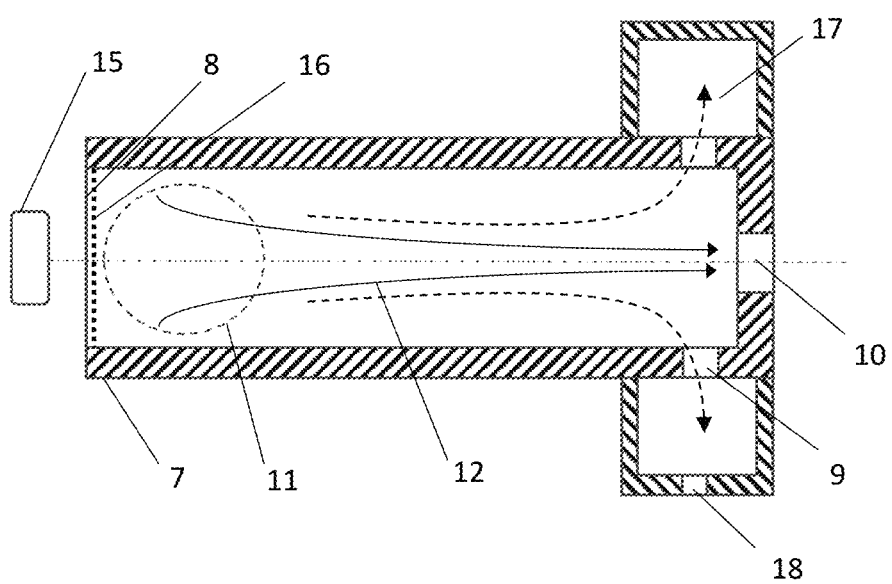
FIG. 7 is schematic side sectional view of an embodiment of the invention similar to the embodiment of FIG. 5 but having a flow distribution chamber downstream of an outlet for non-ionised gas molecules.

FIG. 7 shows an apparatus similar to the embodiment of FIG. 5 except that the apparatus of FIG. 7 is provided with a flow distributer (17) comprising an annular chamber that encircles the downstream end of the ion-concentrating chamber (7) and communicates with the first outlet(s) (9). In this embodiment, the ion-concentrating chamber can have a plurality of outlets (9) spaced (e.g. equidistantly) around the circumference or it can have a single outlet (9) in the form of an annular slot extending around substantially the entire circumference of the chamber. Where there is a plurality of outlets (9) spaced around the circumference, the circumferential distances between adjacent outlets (9) can advantageously be less than the circumferential sizes of the outlets. This arrangement of the outlets (particularly where the outlet (9) is an annular slot) enables the formation of a uniform (that is not influenced by an angle in the Y-Z plane) axially symmetrical flow of air or other gas out of the opening (9) into the flow distributer (17) and finally out of the flow distributor (17) through outlet (18) to a pump or another flow generating device (not shown). Streamlines for this flow are shown schematically by means of dashed curved arrows. The flow distributer (17) enables the gas flow through opening (9) to be more uniform or homogeneous. This enhances the performance of the real-time ion concentrating device.

It should be noted that the presence of the flow distributer or flow homogeniser can be advantageous for any given geometry of the chamber (7) including but not limited to a rectangular chamber, elliptical chamber or polygonal Y-Z cross-section chamber.

Figure 8:
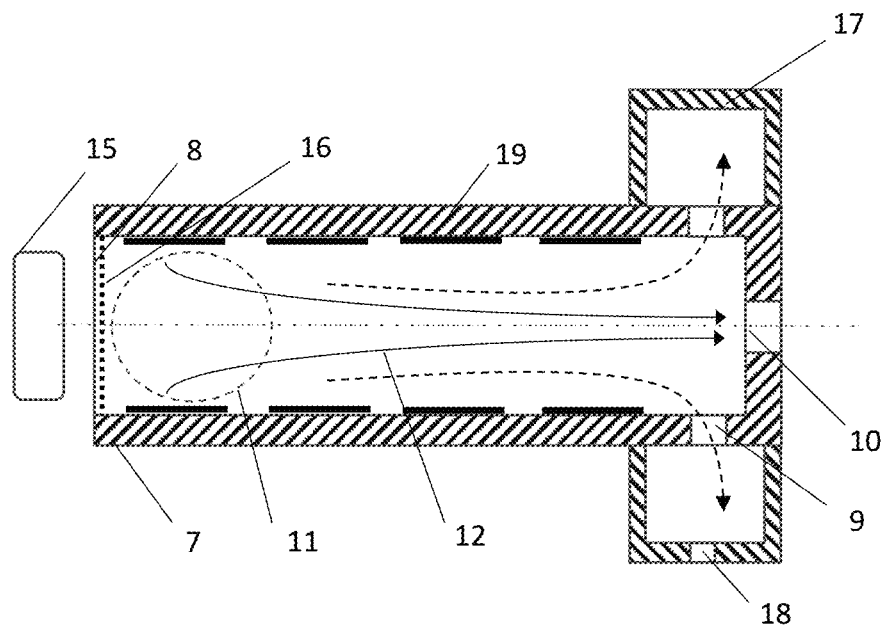
FIG. 8 is a schematic side view of an embodiment of the invention similar to that shown in FIG. 7 but having an array of four metal electrodes on the inner surface of the ion-concentrating chamber.
Figure 8:
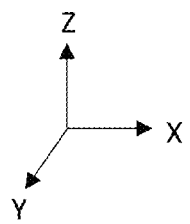

The electrical field within the ion-concentrating chamber can be provided by a plurality of a conductive electrodes (19) mounted on an inner surface of the chamber (7), for example as shown in FIG. 8. In one embodiment, electrodes (19) are formed from cylindrical metal rings and secured to the internal surface of the chamber (7), which can be made from a non-conductive material such as glass or a plastics material.

Where the ion-concentrating chamber (7) is of rectangular cross section (e.g. as shown in FIGS. 6a and 6b), various electrode shapes and configurations are possible depending on the size of the chamber and the sizes of the electrodes. Thus, electrodes can be present on all four sides of the rectangle or on just the top and the bottom surfaces in the X-Y plane. When electrodes are present on all four sides of the rectangle, rectangular electrodes which extend continuously around the inner surface of the chamber in the Y-Z plane can be used. Alternatively, a single continuous rectangular electrode can be replaced by a discontinuous array of individual electrode elements extending around the inner surface of the chamber in the Y-Z plane. Typically a plurality of rectangular electrodes or a plurality of discontinuous arrays of electrode elements are provided at spaced apart locations along the x-axis of the ion-concentrating chamber.

When, as exemplified above, electrodes are present on all four sides of the rectangle, the ion-concentrating apparatus can carry out ion concentration in a three dimensional (3D) mode with constriction of the ion cloud taking place along both the Y and Z axes.

The ion-concentrating chambers can also be configured to operate in a two dimensional (2D) manner where constriction of the ion cloud takes place either along the Y axis or along the Z axis, but not (to any significant extent) along both Y and Z axes at the same time. In this case, the electrodes could be present on just two opposing walls (e.g. the top and bottom surfaces) of the chamber. Thus, with reference to FIG. 8, in an embodiment where the ion-concentrating chamber is of rectangular cross section in the Y-Z plane, in a 2D mode there would be electrodes on two opposing sides of the chamber as shown in FIG. 8, but there would be no electrodes on the other two opposing side walls of the chamber. By contrast, when configured for operation in a 3D mode, there would be electrodes on all four side walls of the chamber.

The number of electrodes (normally—between 1 and 100) and their length to be used in any particular case can be determined by trial and error. In the embodiment illustrated in FIG. 8, when four annular electrodes (19) were used in a cylindrical chamber (7), and the ion-concentrating chamber was connected to an instrument for selecting and quantifying ions, an increase in sensitivity (i.e. concentration of ions) of more than 100 times was achieved, compared to the same instrument but without the ion-concentrating chamber.

It should be understood that the voltages on the electrodes (19) should follow the pattern described above, i.e. the voltage difference along axis X at the internal electrodes should gradually increase along the length of the ion concentrating chamber (X-axis) in such a way that the gradient of the electric potential inside the chamber $dV/dx=E_x(X,Y,Z)$ is substantially a non-linear function of the X co-ordinate. As indicated above, the electric potential should increase gradually along at least part of the length of the chamber, if not the entire length of the chamber.

It is important to notice that the sign of the electric potential in the apparatus of this invention is influenced by the choice of analyte ions (positive or negative ions). Therefore, in the foregoing and following description of the present invention, references to a gradual increase in the electric potential should also be understood as referring to a gradual decrease in the electric potential where the apparatus is set up to concentrate ions of the opposite ion polarity.

In the case of an axial symmetry it is advantageous to apply voltages to the electrodes that generate a radial electric field Er that directs ions of interest to the centre of the chamber (R=0). To achieve this, electric potentials applied to electrodes (19) should form a certain pattern that can be represented as a series of voltages $V_i$, where i is a number of an electrode, e.g. from left to right $1<i<N$ max (N max—the number of electrodes).

In one embodiment of the present invention the series of voltages forms a non-linear set of rational or integer numbers, for example $V1, V2=2*V1, V3=4*V1, \ldots VN\,max=2^{N\,max}*V1$. In this case the difference between $V_{i+1}$ and $V_i$ is a non-linear function of a number of an electrode and, therefore the position of the electrode along the axis X. Voltage applied to the grid (16) may or may not be equal to V1.

In another embodiment of the ion-concentrator of the invention, the voltages $V_i$ form a gradually decreasing pattern when the difference between $V_{i+1}$ and $V_i$ (for $1<i<N$ max) is gradually increasing with number i. The optimal difference between voltages is influenced by the geometry of the concentrator and the flow rates. In practice these voltages can be optimised by trial and error for each different geometry using methods familiar to the person skilled in the art of handling ions in the air.

In further embodiment of the ion concentrator, the voltages $V_i$ form a gradually increasing pattern when the difference between $V_{i+1}$ and $V_i$ (for $1<i<N$ max) is gradually decreasing with number i.

In the each of the embodiments of the ion concentrating device of the invention, a combination of different patterns of voltages applied to electrodes (19) (essentially a non-linear pattern, linear pattern, gradually decreasing or gradually increasing patterns) can be used to achieve better real-time ion concentrating efficiency.

Figure 9:
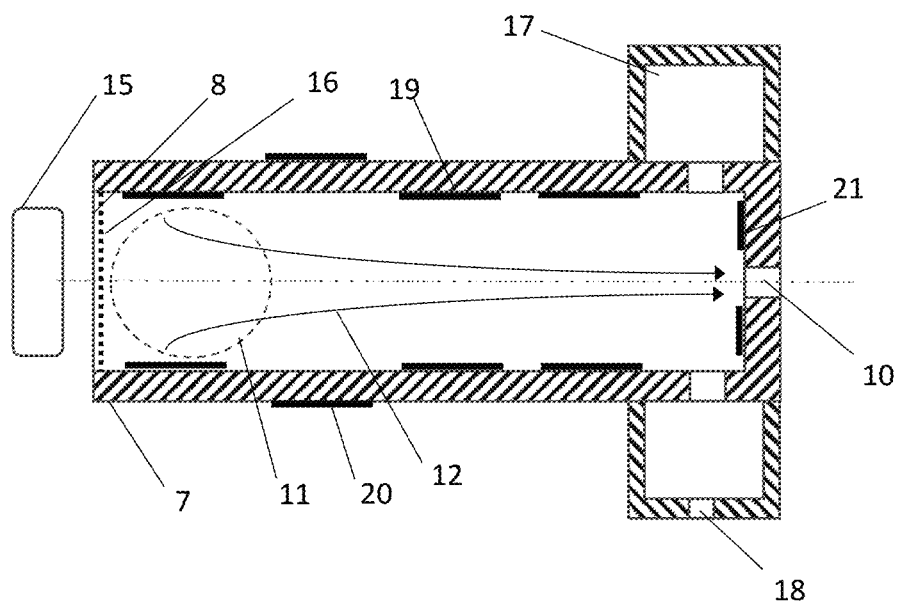
FIG. 9 is a schematic side view of an embodiment similar to that shown in FIG. 8 but with a different electrode layout. In this embodiment, there are four cylindrical electrodes positioned along the length of the ion-concentrating chamber, three mounted on the inner surface of the chamber and one on the outer surface of the chamber, and a further circular electrode surrounding the ionised gas outlet.
Figure 9:
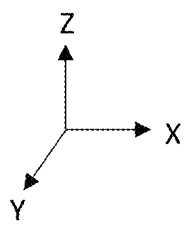

In another embodiment of the ion concentrating device shown in FIG. 9 some electrodes (20) are positioned outside the non-conductive body of the ion-concentrator (7) chamber.

Electrically conductive electrodes can also be positioned inside the non-conductive (electrically) material.

FIG. 9 also shows how some electrodes, e.g. (21) can be positioned on the internal or external (electrically non-conductive) surfaces that are perpendicular to the axis X of the concentrating device (7).

It should be also understood that electrodes (19), (20) and (21) may or may not be axially symmetrical in case of a circular chamber (7). It is especially important if the ion detecting device inlet (10) is not circular but a rectangular or elongated ellipsoidal shape as for example for an ion DMA (U.S. Pat. No. 7,855,360 B2).

Figure 13:
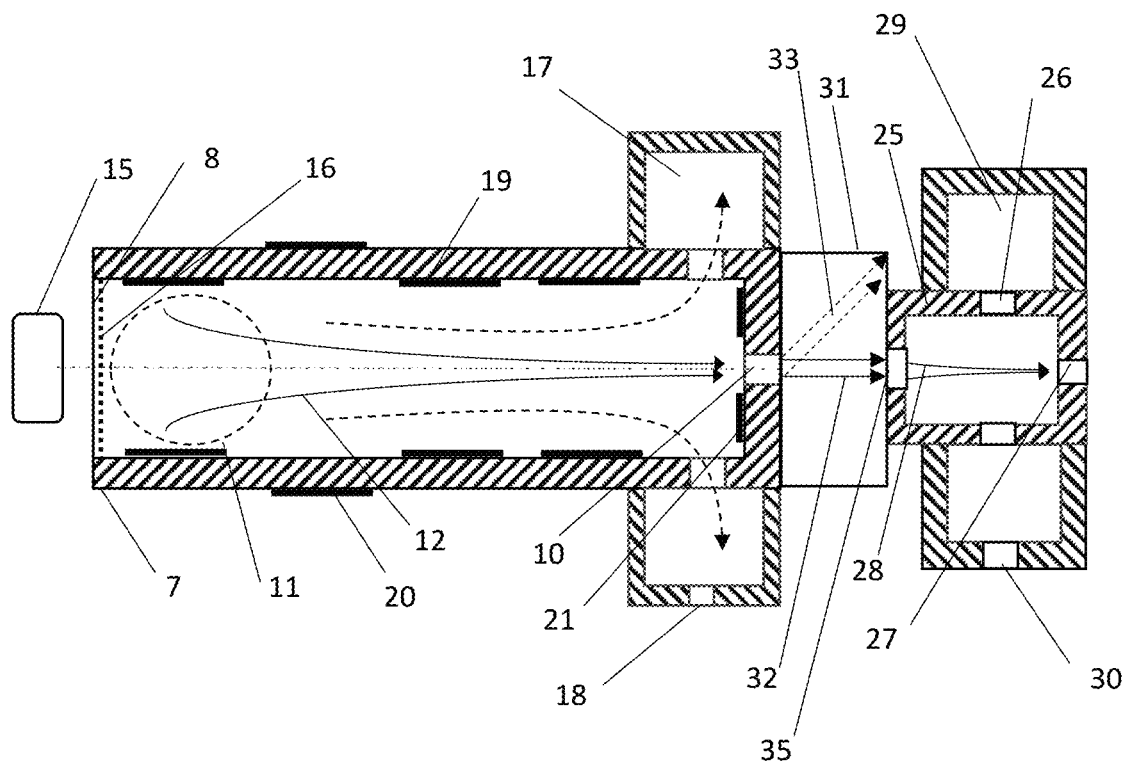
FIG. 13 is a schematic side view of an embodiment showing a tandem arrangement of ion-concentrating chambers similar to that shown in FIG. 12 but with an ion-selecting device positioned between the two ion concentration chambers.
Figure 13:
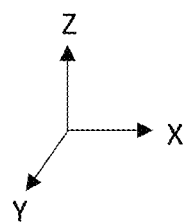

The ion concentrating apparatus of the invention can be linked to various ion detecting systems (such as IMS, MS, DMS, FAIMS, VEFMA and ion DMA (e.g. US20070278398A1, US 20060054804A1, U.S. Pat. Nos. 7,572,319 B2, 6,787,763B2)) where it will act as a real time ion-concentrator and will be of benefit by increasing the sensitivity of detection of various volatile and semi-volatile organic compounds as well as inorganic compounds. Examples of combinations of the ion concentrator apparatus of the invention with ion detecting devices, where the apparatus of the invention functions as a real time ion-concentrator are shown in FIGS. 10, 11 and 13.

Figure 10:
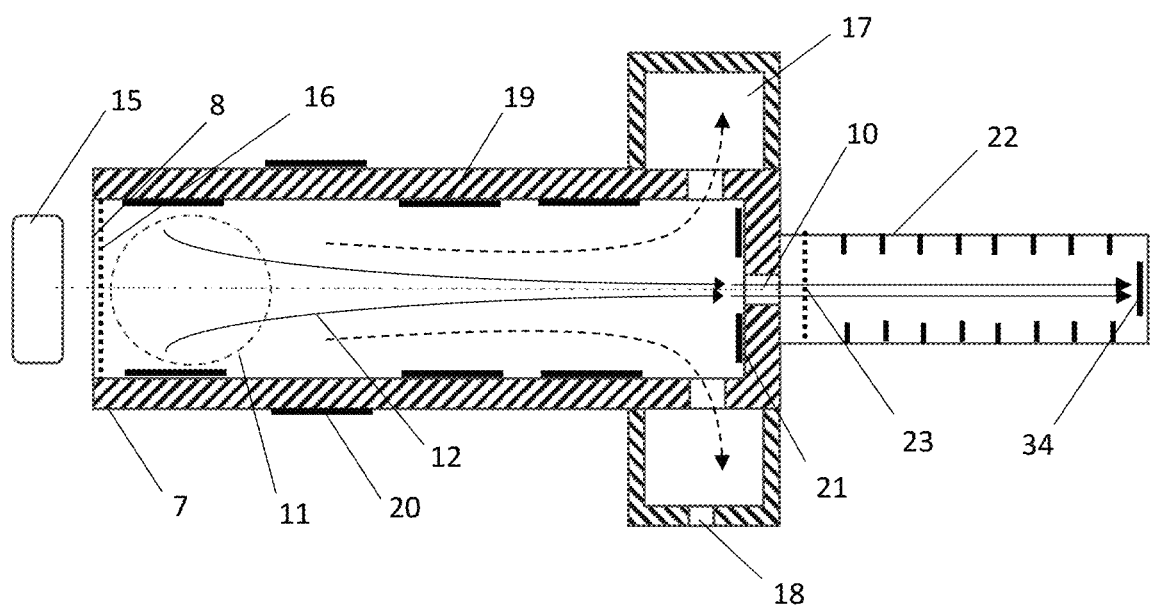
FIG. 10 is a schematic side view of the embodiment of FIG. 9 but showing the ion concentrator connected to an IMS drift tube.

FIG. 10 shows how the apparatus of the invention can act as real-time ion concentrator when interfaced with an Ion Mobility Spectrometer (IMS) device (22). Inside the IMS a linear electric field is created to move ions from the BN-gate (Eiceman, 2002) shown as a dotted line (23) to the Faraday plate detector (34). It is important that the electric field between the outlet (10) of the ion-concentrator (7) and the BN-gate (23) is strong enough to pull ions from the ion-concentrator to the IMS (22).

Figure 11:
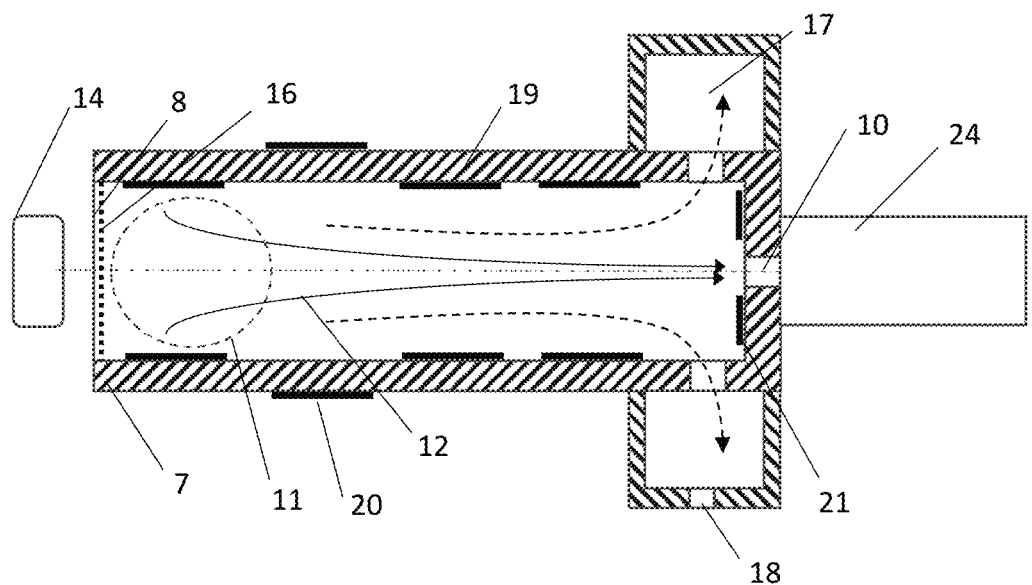
FIG. 11 is a schematic side view of the embodiment of FIG. 9 but showing the ion concentrator connected to an ion DMA.
Figure 11:
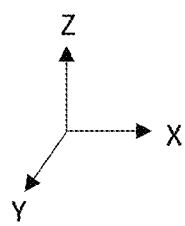

FIG. 11 schematically shows the apparatus of the invention can function as a real-time ion concentrating device when connected to an ion DMA (U.S. Pat. No. 6,787,763). An ion DMA (24) is an ion selecting and ion detecting device and should be interfaced with the apparatus (7) of the invention by choosing a voltage in the inlet of the DMA that generates an electric field that is sufficiently strong to pull ions from the outlet (10) of the concentrator to the inlet of the DMA (24).

Figure 12:
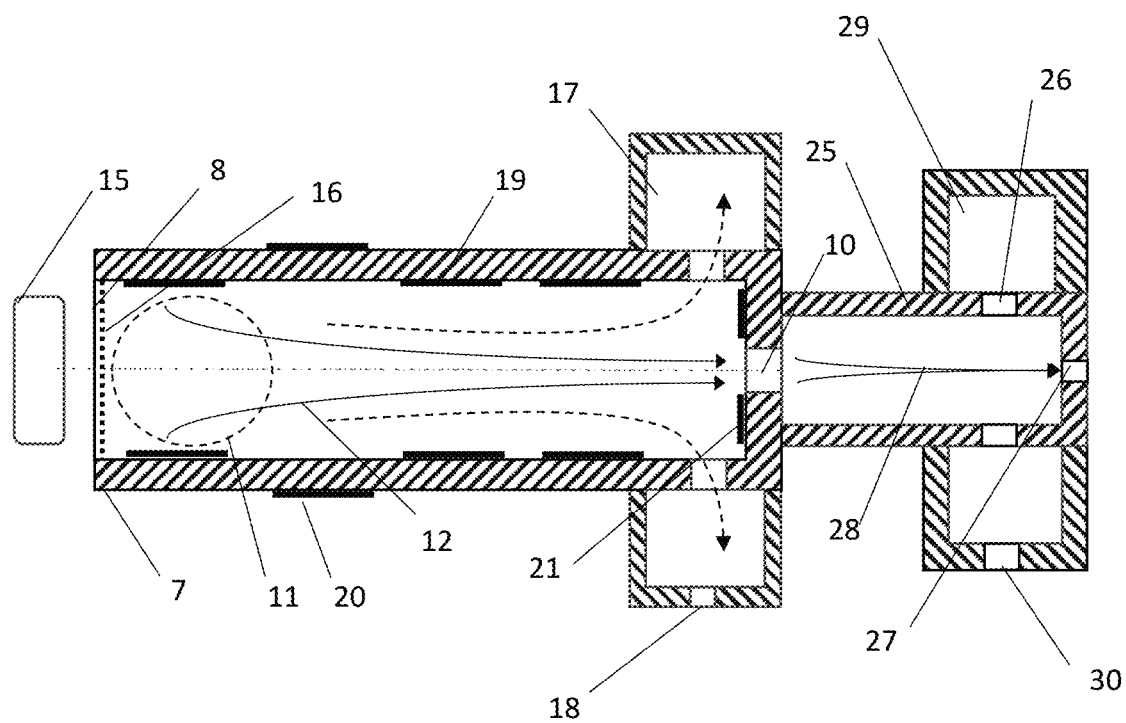
FIG. 12 is a schematic side view of the embodiment of FIG. 9 but showing a tandem arrangement in which the ion concentrator has a second ion-concentrating chamber connected in sequence at a downstream end thereof.

FIG. 12 shows an embodiment of the present invention wherein two ion-concentrators of the invention are connected in series in a tandem system to increase the ion-concentrating ratio. The second ion-concentrator (25) is connected to the outlet (10) of the first ion-concentrator (7). The second ion-concentrator does not require ionisation means, but an additional ionisation facility can be used if required. The second ion-concentrator contains electrodes (not shown) to provide a required electric field, and has first outlet(s) (26) and a second outlet (27) that provide a high concentration flow of ions to be used by any ion measuring device connected downstream of the ion-concentrators of the invention The mode of action of the tandem ion concentrator is similar to a single ion-concentrator. Ions formed and concentrated in the first ion-concentrator (7) enter the second ion concentrator (25) via the outlet (10) of the first-concentrator (7). The non-linear electric field generated in the second ion-concentrator (25) along with the velocity field concentrate ions (12) further to a narrower stream (28). The neutral analyte and air molecules are directed to the first outlet(s) (26). Depending on the geometry of the chamber (25) the shape of the first outlet may be a circular slot (for axial symmetry geometry), rectangular slots (for 2D or 3D geometries) or any suitable shape that as desired. The outlet(s) (26) are connected to a flow distributer/homogeniser (29) where the outlet (30) is connected to a pump with a flow control system (not shown) to maintain the flow rate of the gas through the outlet. The narrow stream of concentrated ions (28) passes through the second outlet (27) of the second ion-concentrator (25) and may be connected to any ion quantifying or collecting instrument.

This system enables the concentration of analytes to be increased further to the level that enables remote detection of explosives and contraband substances when the ion-concentrator of the invention is used in conjunction with any currently used or any known device.

It should be understood that a plurality of ion-concentrating devices can be used connected to each other either sequentially or in parallel to achieve a higher concentration ratio and simultaneous detection of different types of ions, for example positive and negative ions, heavy and light ions, etc.

FIG. 13 shows an embodiment of the ion-concentrator having tandem chambers (7) and (25) with an ion selecting device (31) positioned between them to eliminate/reduce volume charges by filtering out some ions from the ion cloud with analytes, for example reagent ions. In operation, analyte molecules are first ionised in the first ion-concentrator (7) as described above. Ions concentrated in the first chamber (7) are directed to the ion selecting device, e.g. a DMA (31). In the DMA reagent ions (such as $N_2^+$ and $O_2^+$) shown as two dashed lines (33) are deflected from the outlet (35) of the DMA (31). The analyte ions (32) are then directed through the DMA outlet (35) to the inlet of the second ion-concentrator (25) where the ion bundle (28) becomes further concentrated and directed to the outlet (27) of the second pre-concentrator (25).

The ion separating device (31) enables removal of reagent ions (33) from the ion cloud and therefore reduces the volume charge effect caused by the repulsion forces. Thus, the volume-charge-limit is removed, and the ion-concentrating ratio can be increased further.

It is noted that an ion separating device (31) placed between two ion-concentrating devices (7) and (25) may or may not be a low-resolution device. If an ion separating device (31) is a high-resolution device then it may increase the resolving power of the final ion characterisation instrument connected to the outlet (27).

The ion-concentrators of the invention can be operated at ambient temperature or either the whole system (containing ion-concentrators and an ion separating device), or parts of the system, can be operated at elevated temperatures to reduce adsorption of analytes on the internal walls and increase sensitivity and resolving power.

It will be appreciated that a plurality of both ion-concentrators and ion selecting or separating devices can be connected in parallel and in series. Also, the ion-concentrating device and a system that includes one or several ion-concentration devices can be used with various ion measuring instruments such as IMS, DMS, DMA, FAIMS, Variable Electric Field Mobility Analyser (VEFMA) (U.S. Pat. No. 8,378,297B2) and MS.

It will also be appreciated that air is not the only medium where the real-time ion-concentrating of ions can be arranged. The ion-concentrating device can work in any gas medium, e.g. hydrocarbon based natural gas, clean gases used in microelectronics, other (even corrosive) gases and gas mixtures.

The real-time ion concentrator can also operate at a reduced atmospheric pressure (rarefied gas) or in a vacuum when the vacuum medium can be considered as a fluid medium, for example so called "high-pressure" Mass Spectrometers.

It will be appreciated that the methods and apparatuses according to any of the above embodiments can be used without ionisation means when analyte ions of interest are already present in a gas sample. Thus an apparatus without an ionisation means, or where an ionisation means is switched off, can be used in applications when trace quantities of ions in the air and any other gases have to be detected or identified, for example in atmospheric research or for quantification of extremely low ionising levels of radiation in nuclear physics or geophysics.

It should be noted that the prior art pre-concentrator apparatuses and methods referred to in the introductory section above focus on deposition and evaporation of molecules, but not ions. The concentrating of ions using these prior art pre-concentrators is practically impossible.

EXAMPLES

Example 1

An ion-concentrator apparatus having cylindrical geometry (shown schematically in FIG. 8 and FIG. 11) was manufactured from Perspex and aluminium with the internal dimensions of 5 cm ID and 8 cm length with 3 aluminium electrodes of graduating size separated with PTFE insulators. A soft X-Ray source of 4.9 kV was used to ionise molecules in the air flow. The flow rates were from 0.3 l/min to 2.0 l/min. The voltages applied to the grid and the first electrode were from 200 V to 2,000 V.

The ion-concentrator apparatus was connected to an ion-selecting device (U.S. Pat. No. 10,458,946) where ions were selected in a DMA and then ions of the selected mobility were directed to an individual ion counter built according to U.S. Pat. No. 7,372,020B2. In operation, an air sample flow was introduced into the inlet (8) FIG. 11 into the ion-concentrating device (7) ibid where ion concentration occurs and a concentrated ion cloud (12) ibid is moved into the DMA (24) ibid. The DMA was interfaced with an individual ion counter, not shown. In the DMA variation of the electric potential difference between the DMA electrodes enables selection of ions of different mobility and the recording of mobility spectra.

Figure 14:
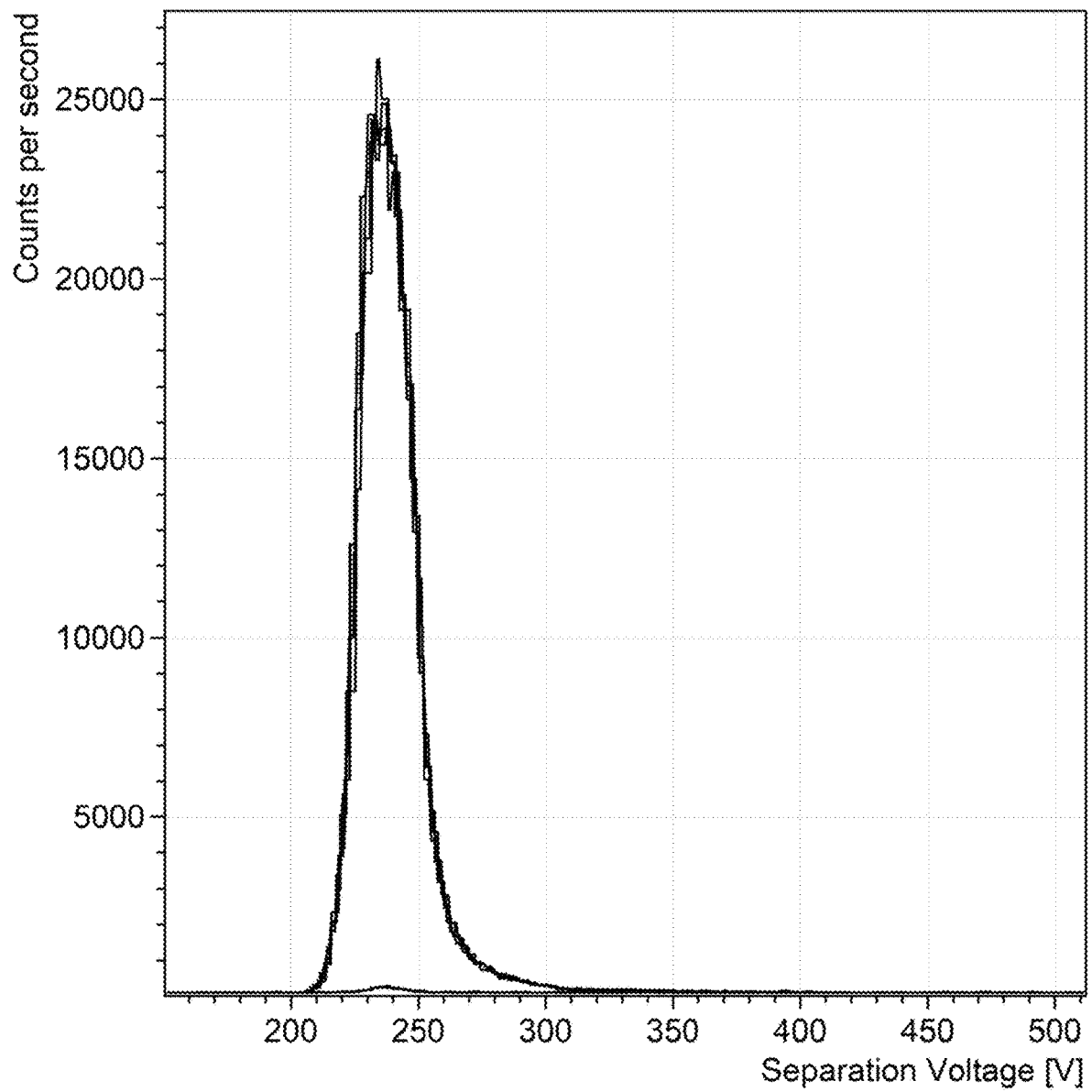
FIG. 14 shows ion mobility spectra (concentrations of ions measured with an ion selecting DMA vs. the voltage difference between ion separating electrodes of the DMA) for the reagent ions which were obtained (i) with a voltage applied to the ion concentration chamber; and (ii) without a voltage applied to the ion concentration chamber. The ion concentration apparatus used was similar to the apparatus shown in FIG. 11. The DMA used was as described in U.S. Pat. No. 10,458,946.
Figure 15:
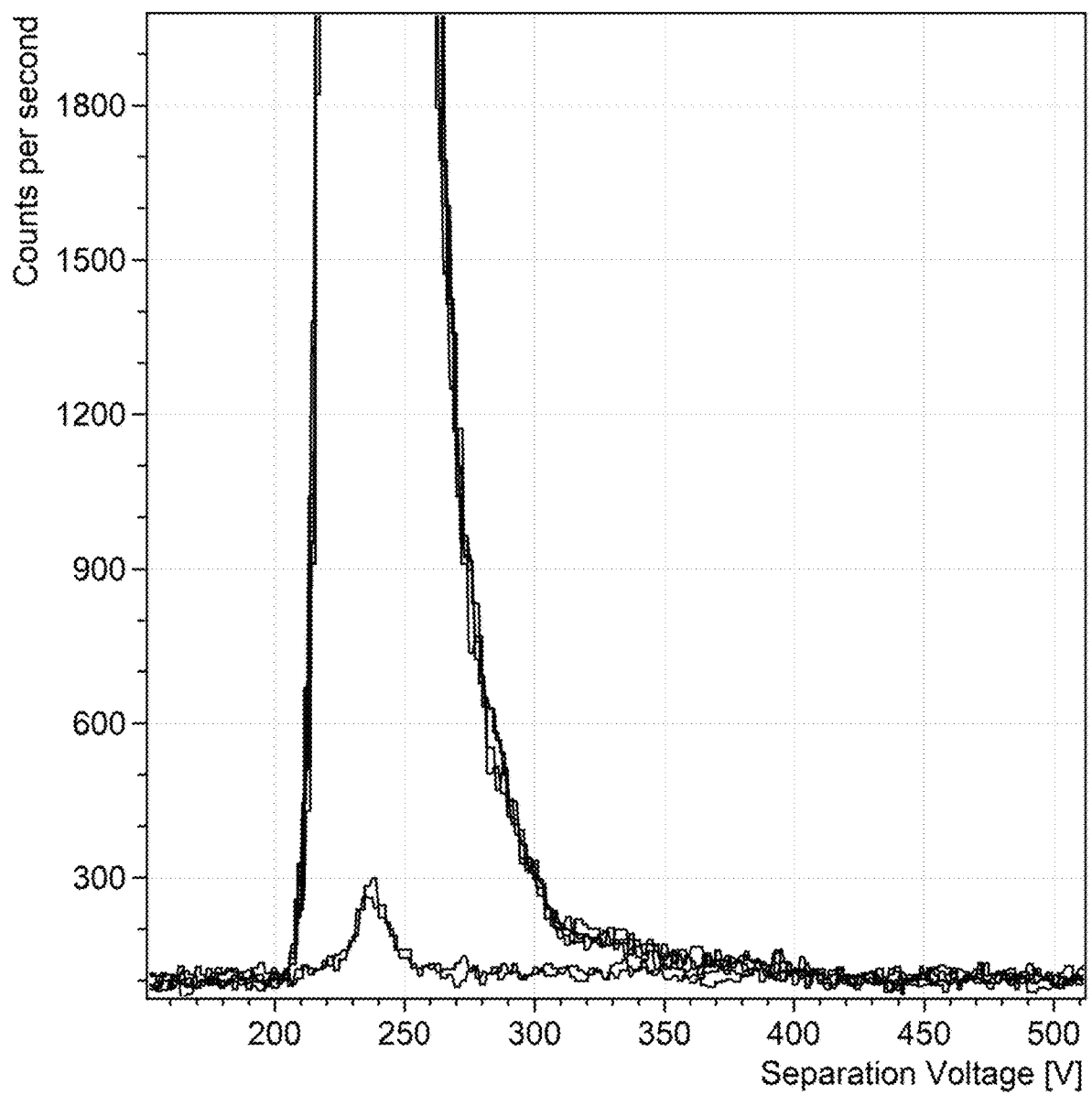
FIG. 15 is a magnified version of the ion mobility spectra shown in FIG. 14, where the scale has been expanded along the y-axis so that the spectrum obtained when there no applied voltage in the ion concentration chamber can be seen more clearly.

FIG. 14 shows two groups of mobility spectra of reagent ions formed in the real-time ion-concentrating device at the flow rate 0.3 l/min that were recorded with and without voltage applied to the real-time ion-concentrating device. An individual ion-counting device was used as an ion detector to count the number of ions coming out of the DMA. A group of large peaks at 240 V was obtained when a voltage was applied to the ion-concentrating device. A very small peak at the DMA separation voltage was recorded with the ion-concentrating device voltage switched off. The average magnitude of counts for spectra with the voltage on was ~25,000 counts per second. The average magnitude of the signal without the voltage was ~260 counts per second, see FIG. 15. Therefore, the ion count rates at the maximum of the peaks recorded with the ion-concentrating device in operation was almost two order of magnitude (i.e. almost two hundred times) greater than the concentration when ion-concentrating device was switched off.

The individual ion counter used in the apparatus described above was designed to operate at a very low ion count rate, normally below 2,000 counts per second. The measured magnitude of the peak (about 25,000 counts per second) is higher than the upper limit of the individual ion counting device. In this case, an individual ion counting device operating at higher count rates may be saturated, resulting in broader spectra widened. A more precise evaluation of the ion concentration denoted by of a saturated peak is given by the total number of ions obtained by integration of the ion spectra. For the apparatus described above, the ratio of the integral ion concentrations measured with and without the voltage applied to the real-time ion concentrator is circa 300 times. Therefore, the real-time ion concentrator of the invention enables concentrations of ions to be increased by more than two orders of magnitude. In practical terms, the invention makes possible the remote detection of explosives, contraband goods and other threats in real time with greatly improved sensitivity.

REFERENCES

UK patent Application GB 2560565 A by B. Gorbunov
U.S. Pat. No. 7,572,319 B2 by A. Tipler, G. Campbell, M. Collins
U.S. Pat. No. 7,855,360 B2 by J. Fernandez de la Mora, A. Casado
G. A. Eiceman. Ion-mobility spectrometry as a fast monitor of chemical composition. *trends in analytical chemistry*, vol. 21, no. 4, 2002. (IMS for explosives)
U.S. Pat. No. 7,199,362B2 by A. L. Rockwood, E. D. Lee, N. Agbonkonkon, M. L. Lee
Cheng et al., Dopant-Assisted Negative Photoionization Ion Mobility Spectrometry for Sensitive Detection of Explosives, *Anal. Chem.* 2013, 85, 1, 319-326.
Gaik et al., *Anal. Bioanal. Chem.* (2017) 409:3223-3231, DOI 10.1007/s00216-017-0265-2

The invention claimed is:

1. A method for increasing the number concentration of molecules of an analyte of interest in real time from a sample gas flow containing ionised molecules of the analyte, aerosol particles and other molecules; the method comprising:
    passing the sample gas flow through an inlet of an ion-concentrating chamber, the ion-concentrating chamber having an ion-collecting outlet and at least one other outlet; and
    in the ion-concentrating chamber, subjecting the sample gas flow containing the analyte ions, aerosol particles and other molecules to a non-linear electric field and a velocity field that act on the sample gas flow such that analyte ions are concentrated by the combined effects of the electric field and velocity field into a smaller space and are directed to the ion-collecting outlet, and the aerosol particles and other molecules are directed to the at least one other outlet; wherein the electric field is created by a plurality of electrodes arranged in an axially spaced apart manner along the ion-concentrating chamber and wherein the method comprises progressively increasing electric potential differences between the electrodes along the ion-concentrating chamber.

2. A method according to claim 1 which comprises configuring the electric field so that it brings about a progressive lateral constriction of an ion cloud containing ions of an analyte of interest as it moves through the ion-concentrating chamber.

3. A method according to claim 1 wherein the progressively increasing electric potential differences are achieved by gradually increasing electric potential differences between the electrodes along the length of the ion-concentrating chamber.

4. A method according to claim 1 which comprises a further step of directing analyte ions collected through the ion-collecting outlet to a device for detecting and/or identifying and/or quantifying the analyte ions.

5. A method according to claim 1, which comprises a further step of directing analyte ions collected through the ion-collecting outlet to a device for detecting and/or identifying and/or quantifying the analyte ions selected from an ion mobility spectrometer (IMS, a differential mobility spectrometer (DMS), a differential mobility analyser (DMA), a field asymmetric ion mobility spectrometer (FAIMS), a variable electric field mobility analyser (VEFMA), and a gas chromatograph-mass spectrometer (GC-MS).

6. A method according to claim 1 wherein the progressively increasing electric potential differences are achieved by increasing electric potential differences between the electrodes along the length of the ion-concentrating chamber in such a way as to progressively increase a voltage gradient therein in accordance with the expression $dV/dX = \Delta V/\Delta X$, where $dV/dX$ is the average gradient of the electric potential inside the ion concentrating chamber, $\Delta V$ is the voltage difference between two adjacent electrodes and $\Delta X$ is a gap defined by the presence of an electrical insulator between the electrodes.

7. A method for increasing the number concentration of molecules of an analyte of interest in real time from a sample gas flow containing ionised molecules of the analyte, aerosol particles and other molecules; the method comprising:
    passing the sample gas flow through an inlet of an ion-concentrating chamber, the ion-concentrating chamber having an ion-collecting outlet and at least one other outlet; and
    in the ion-concentrating chamber, subjecting the sample gas flow containing the analyte ions, aerosol particles and other molecules to a non-linear electric field and a velocity field that act on the sample gas flow such that analyte ions are concentrated by the combined effects of the electric field and velocity field into a smaller space and are directed to the ion-collecting outlet, and the aerosol particles and other molecules are directed to the at least one other outlet; wherein the electric field is created by a plurality of electrodes arranged in an axially spaced apart manner along the ion-concentrating chamber and wherein the method comprises increasing electric potential differences between the electrodes along the length of the ion-concentrating chamber in such a way as to progressively increase a voltage gradient therein in accordance with the expression $dV/dX = \Delta V/\Delta X$, where $dV/dX$ is the average gradient of the electric potential inside the ion concentrating chamber, $\Delta V$ is the voltage difference between two adjacent electrodes and $\Delta X$ is a gap defined by the presence of an electrical insulator between the electrodes.

* * * * *